United States Patent [19]

Matsuoka et al.

[11] Patent Number: 5,762,159
[45] Date of Patent: Jun. 9, 1998

[54] POWER STEERING APPARATUS

[75] Inventors: Hirofumi Matsuoka, Souraku-gun; Kimihito Chino, Kashiwara, both of Japan

[73] Assignee: Koyo Seiko Co., Ltd., Osaka, Japan

[21] Appl. No.: 612,241

[22] Filed: Mar. 7, 1996

[30] Foreign Application Priority Data

Mar. 9, 1995 [JP] Japan ................................. 7-050072

[51] Int. Cl.⁶ ........................................... B26D 5/06
[52] U.S. Cl. ........................ 180/422; 180/417; 180/421
[58] Field of Search ........................ 180/417, 421, 180/422, 443, 446

[56] References Cited

U.S. PATENT DOCUMENTS

| | | |
|---|---|---|
| 4,392,540 | 7/1983 | Michio et al. |
| 5,029,660 | 7/1991 | Raad et al. ............... 180/422 |
| 5,289,894 | 3/1994 | Yoshiyuki ............... 180/422 |
| 5,372,214 | 12/1994 | Haga et al. ............... 180/422 |
| 5,467,281 | 11/1995 | Iwashita et al. ............ 180/422 |

FOREIGN PATENT DOCUMENTS 053 297  6/1982  European Pat. Off.

*Primary Examiner*—Daniel G. DePumpo
*Attorney, Agent, or Firm*—Darby & Darby

[57] ABSTRACT

A power steering apparatus comprising structure for smoothing a load detection signal obtained by detecting the load of a hydraulic pump and structure for controlling the rotational speed of an electric motor for driving the hydraulic pump, wherein the control valve controls a working oil pressure by a hydraulic pump on the basis of manipulation of steering wheel, whereby the steering operation is assisted.

19 Claims, 22 Drawing Sheets

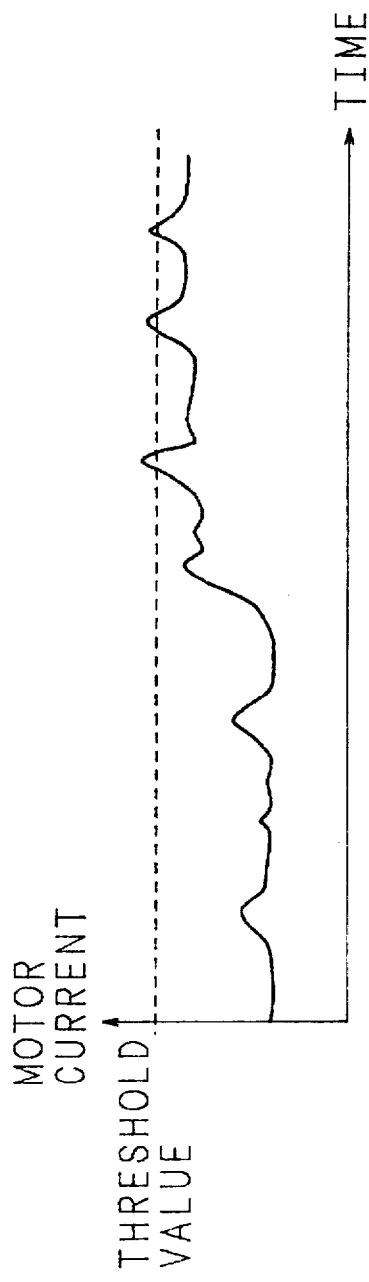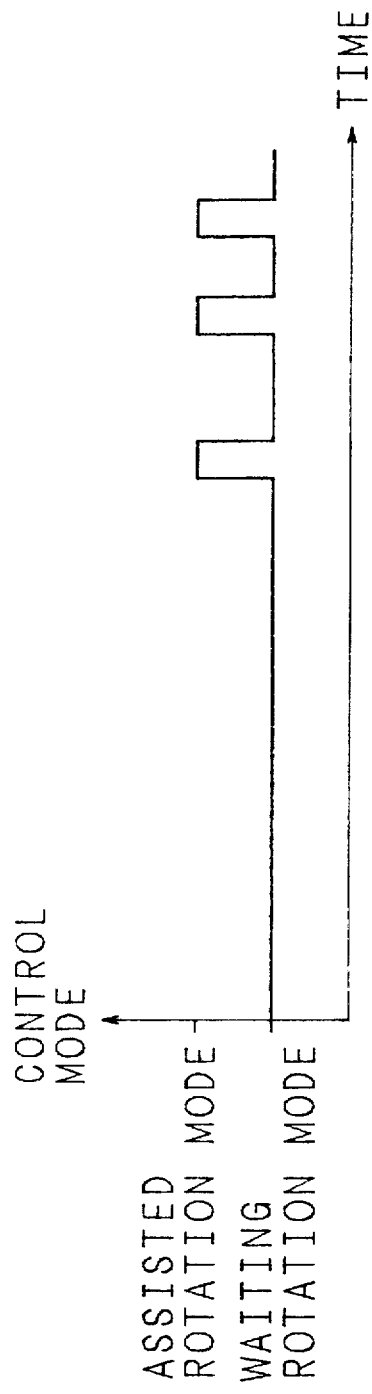
FIG. 3A PRIOR ART
FIG. 3B PRIOR ART

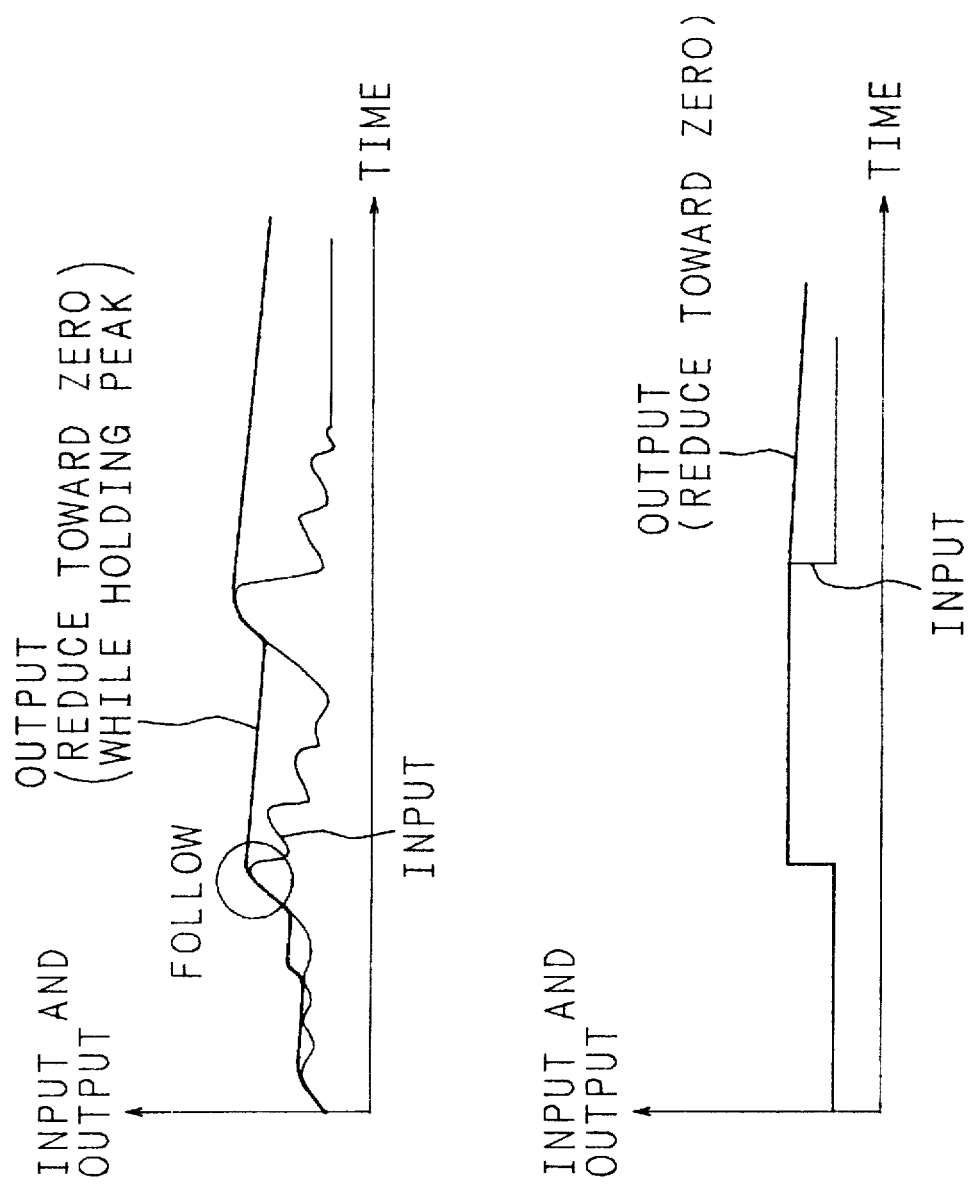

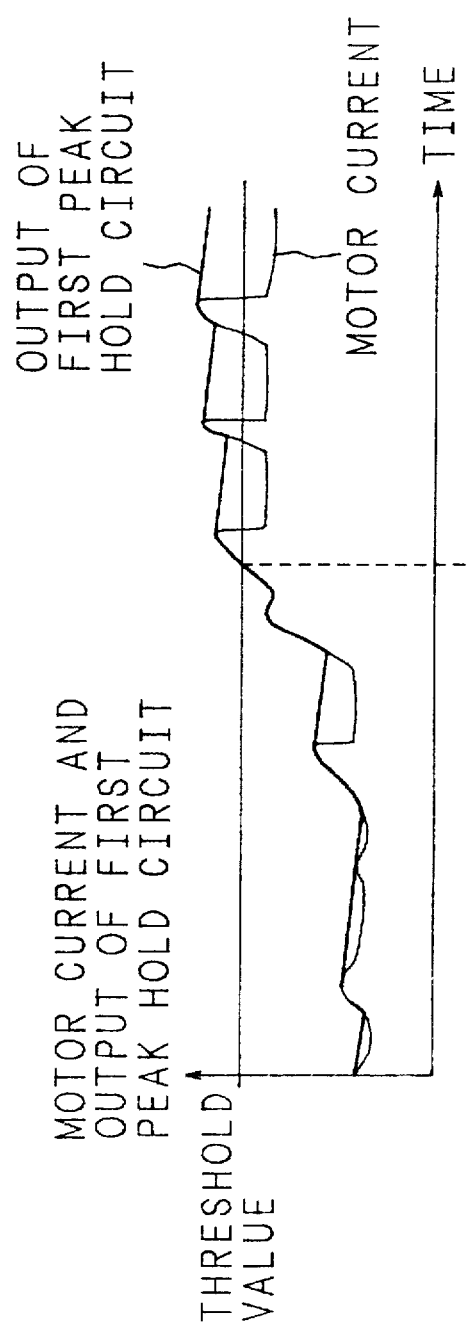
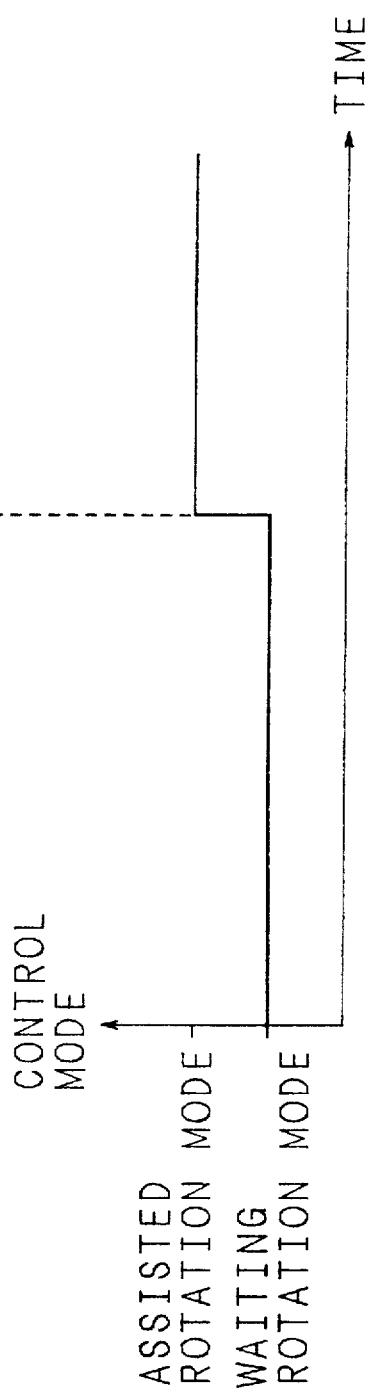
FIG. 6A
FIG. 6B

ND THE INVENTION

POWER STEERING APPARATUS

BACKGROUND OF THE INVENTION

1. Field of the Invention

The present invention relates to an improvement of a power steering apparatus with the steering operation thereof assisted using the working oil pressure generated by a hydraulic pump driven by an electric motor.

2. Description of Related Art

FIG. 1 is a block diagram showing a configuration of the essential parts of a conventional power steering apparatus for providing steering assistance using the working oil pressure generated by the hydraulic pump driven by an in electric motor. In this power steering apparatus, an electric motor 4 is supplied with a voltage and driven by a motor drive circuit 2 in accordance with a target applied voltage corresponding to a target rotational speed of the electric motor 4 indicated by a controller 1, and the electric motor 4 generates the working oil pressure by driving the hydraulic pump 5.

A steering wheel 7 is manipulated thereby to activate a gear unit including a pinion gear 6c provided at the lower end of a steering wheel shaft. A control valve 6 thus controls the pressure of the working oil to be sent under pressure to pipe lines 6a, 6b communicating with a power cylinder. As a result, the power cylinder is operated thereby to generate a steering assisting power in an amount and direction in which the steering wheel 7 is manipulated.

A motor current detection circuit 3 (load detection means) for detecting the current flowing in the electric motor 4 is interposed between the motor drive circuit 2 and the electric motor 4 in order to detect the current flowing in the electric motor 4. The motor current detection signal produced from the motor current detection circuit 3 is applied to the controller 1. The controller 1 controls by switching the target rotational speed of the electric motor 4 in accordance with the motor current detection signal.

With a conventional steering power apparatus having the above-mentioned configuration, the controller 1 sets the motor drive control to waiting rotation mode (low rotational speed), as shown in FIG. 2, and thus reduces the output of the electric motor 4 in order to suppress energy consumption when the steering wheel 7 is not manipulated requiring no steering assisting power (when the current flowing in the electric motor 4 is small). Assume that the steering wheel 7 is manipulated, thereby activating the control valve 6, the working oil pressure increases for a higher load, and that the current flowing in the electric motor 4 also increases, with the motor current detection signal of the motor current detection circuit 3 reaching a predetermined threshold value for causing transfer from waiting rotation mode to assisted rotation mode of high rotational speed. Then, the controller 1 switches the motor drive control to assisted rotation mode (high rotational speed), and thereby increasing the output of the electric motor 4.

In this power steering apparatus, in the case where the motor current detection signal undergoes a change at about the threshold value described above as shown in FIG. 3A, the switching between waiting rotation mode and assisted rotation mode is repeated (hunching) as shown in FIG. 3B, with the result that the steering assisting power is changed, thereby deteriorating the steering feel.

Also, the viscous resistance of the working oil changes with temperature. The load of the electric motor 4, therefore, also changes with temperature. Even in the absence of steering input for lack of steering operation, the motor current detection signal undergoes a change with the lapse of time from the operation start. The motor current detection signal is also subjected to a change due to such factors as vehicle vibrations other than the viscous resistance. Consequently, the threshold value of the motor current detection signal for transfer from waiting rotation mode to assisted rotation mode is required to be set to a level sufficiently large as compared with the motor current detection signal in the absence of a load (in the absence of steering input) as shown in FIG. 2 in order to prevent transfer to assisted rotation mode as a result of a change in motor current detection signal due to factors other than the steering input. This deteriorates the response of steering assistance.

The viscous resistance of oil is reduced by secular variation, and the motor current detection signal in the absence of load decreases. The secular variation, therefore, increases the difference between the threshold value and the motor current detection signal in the absence of load, thereby posing the problem of a deteriorated response of steering assistance.

SUMMARY OF THE INVENTION

The present invention has been developed to solve the above-mentioned problems, and an object of the invention is to provide a power steering apparatus having a superior steering feel without any hunching of steering assistance, in which the influence of secular variation and temperature change on the steering assistance response can be removed.

According to one aspect of the present invention, there is provided a power steering apparatus comprising smoothing means for smoothing the load detection signal obtained by detecting the load of a hydraulic pump, and means for controlling the rotational speed of an electric motor on the basis of the signal smoothed by control means.

According to another aspect of the invention, there is provided a power steering apparatus comprising smoothed signal correction means for correcting the smoothed signal in the absence of steering input and applying the corrected signal to the control means, in which the control means controls the drive of the electric motor at a low rotational speed when the corrected smoothed signal is smaller than a predetermined value (waiting rotation mode), and at a high rotational speed when the corrected smoothed signal is larger than the predetermined value (assisted rotation mode).

In the smoothed signal correction means, minimum holding means detects, holds and outputs an ever-changing minimum value of the smoothed signal, and deviation computation means computes the deviation between the smoothed signal and the minimum value outputted from the minimum holding means, which the deviation is applied to the control means as the corrected smoothed signal. It is thus possible to eliminate the influence of the change in the load detection signal in the absence of a load (in the absence of steering input) due to the secular variation and temperature change on the response of steering assistance.

The minimum holding means includes means for progressively increasing the signal held and outputted in accordance with a predetermined characteristic when the smoothed signal from the smoothing means is larger than the signal held and outputted. The supply voltage to the electric motor can thus properly follow the change in the load detection signal in the absence of load due to the lapse of time from the start of operation, thereby eliminating the influence of the change in the load detection signal on the steering assistance response.

According to still another aspect of the invention, there is provided a power steering apparatus comprising a reset circuit for resetting the output of the minimum holding means at the time of operation start at a predetermined value. The minimum holding means, therefore, can detect, hold and output the load detection signal in the absence of load from the time of operation start.

The smoothing means is constituted by a first peak hold circuit including output signal progressive reduction means for progressively reducing the signal held and outputted in accordance with a predetermined characteristic when the load detection signal is smaller than the signal held and outputted. The control means, therefore, can control the drive of the electric motor following the change of a large period but not the change of a small period of the load detection signal at the time of transfer from assisted rotation mode to waiting rotation mode, thereby making it possible to reduce the hunching at the time of steering assistance.

According to still another aspect of the invention, there is provided a power steering apparatus comprising means for removing the inertial load component of the hydraulic pump and the electric motor contained in the smoothed signal from the first peak hold circuit and generated at the time of transfer from assisted rotation mode to waiting rotation mode and applying the signal obtained by removing the inertial load component to the minimum holding means. The inertial load component removing means is constituted by a second peak hold circuit, for example, including output signal progressive reduction means for progressively reducing the signal held and outputted in accordance with a predetermined characteristic when the smoothed signal is smaller than the signal and outputted. In such a case, the minimum holding means cannot detect and hold an instantaneous reduction in the load detection signal due to an inertial load.

The inertial load component removing means may directly smooth the load detection signal, remove the inertial load component of the hydraulic pump generated at the time of transfer from assisted rotation mode to waiting rotation mode and contained in the load detection signal, and apply the resulting smoothed signal to the smoothed signal correction means.

Another object of the invention is to provide a power steering apparatus superior in both steering feel and steering assistance response, in which the steering assisting operation is not subjected to hunching.

A power steering apparatus according to the invention comprises a low-pass filter applicable as the smoothing means.

Still another object of the invention is to provide a power steering apparatus superior in both steering feel and steering assistance response with hunching-free steering assistance, in which the steering assistance is not affected by the variation in motor current detection signal due to factors other than the steering operation.

According to a further aspect of the invention, there is provided a power steering apparatus comprising parameter computation means for computing a parameter based on the smoothed signal, parameter judgment means for judging the relative magnitudes between the parameter and a predetermined value and applying the judgment result to the control means, and control means for controlling by switching between waiting rotation mode and assisted rotation mode in accordance with the judgment result of the parameter judgment means. The parameter computation means may be means for differentiating the smoothed signal or may be a combination of the differentiation means and adder means for adding the signal differentiated by the differentiation means and the smoothed signal and outputting the sum as the parameter. The apparatus according to this aspect of the invention may further comprise smoothed signal judgment means for judging the relative magnitudes between the smoothed signal and a predetermined value and logic computation means for computing the logic between the judgment result of the smoothed signal judgment means and the judgment result of the parameter judgment means, in which the control means may control by switching the waiting rotation mode and assisted rotation mode in accordance with the computation result of the logic computation means.

The above and further objects and features of the invention will more fully be apparent from the following detailed description with accompanying drawings.

BRIEF DESCRIPTION OF THE DRAWINGS

FIG. 3A is a diagram for explaining the operation of the conventional power steering apparatus;

FIG. 3B is a diagram for explaining the control mode corresponding to FIG. 3A;

FIG. 5A is a diagram for explaining the operation of a first peak hold circuit shown in FIG. 4;

FIG. 5B is a diagram for explaining the operation of a second peak hold circuit shown in FIG. 4;

FIG. 6A is a diagram for explaining the operation of the first peak hold circuit shown in FIG. 4;

FIG. 6B is a diagram for explaining the control mode corresponding to FIG. 6A;

DESCRIPTION OF THE PREFERRED EMBODIMENTS

Figure 1:
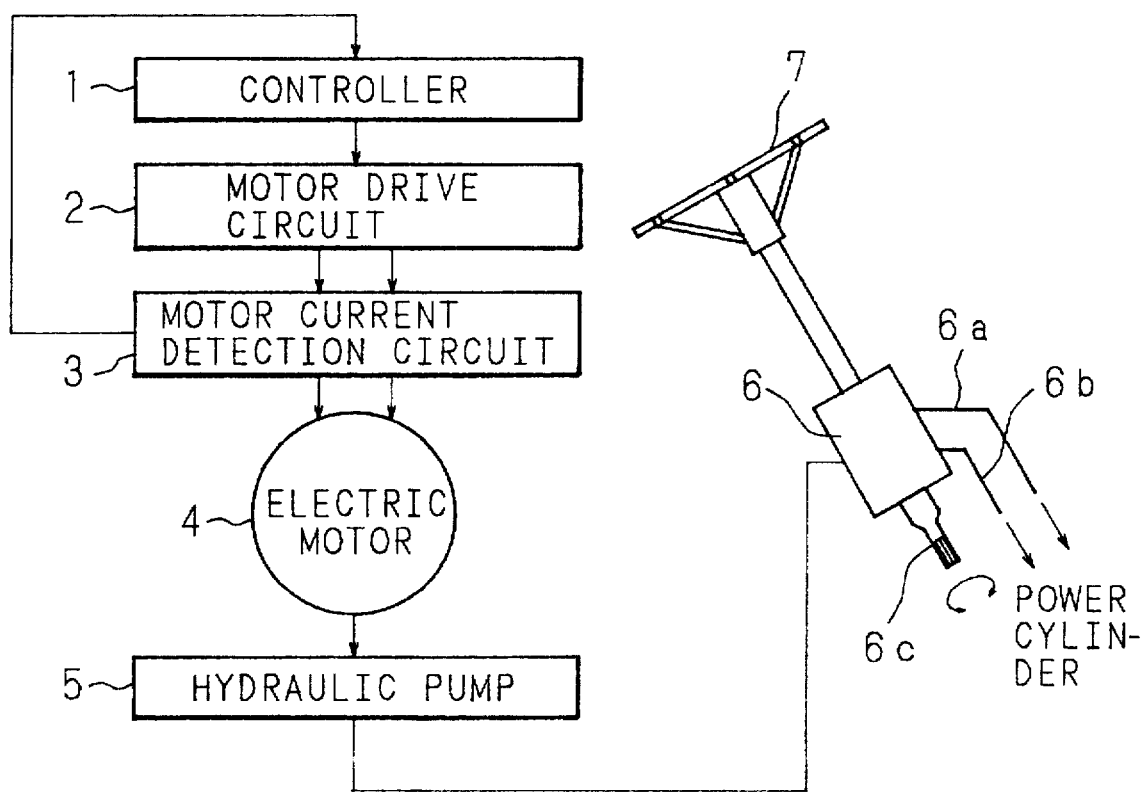
FIG. 1 is a block diagram showing a configuration of the essential parts of a conventional power steering apparatus.
Figure 2:
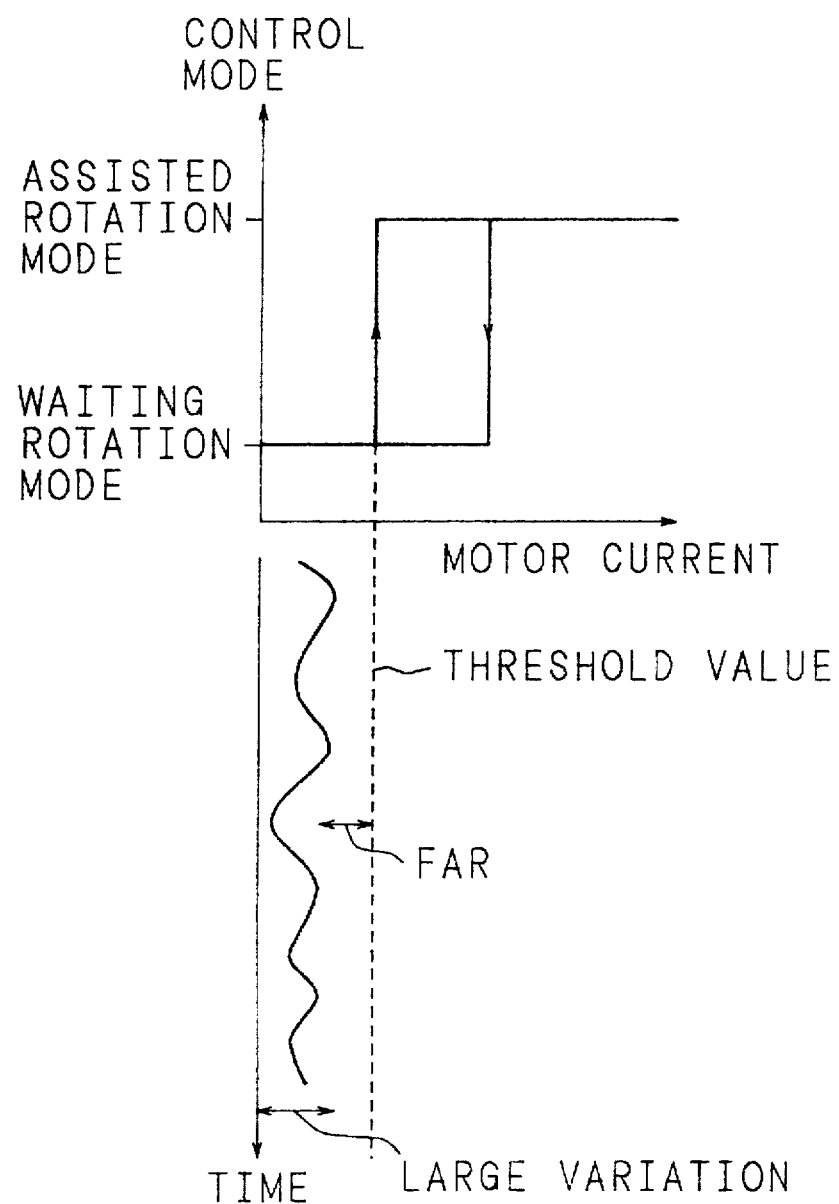
FIG. 2 is a diagram for explaining the operation of the conventional power steering apparatus.
Figure 4:
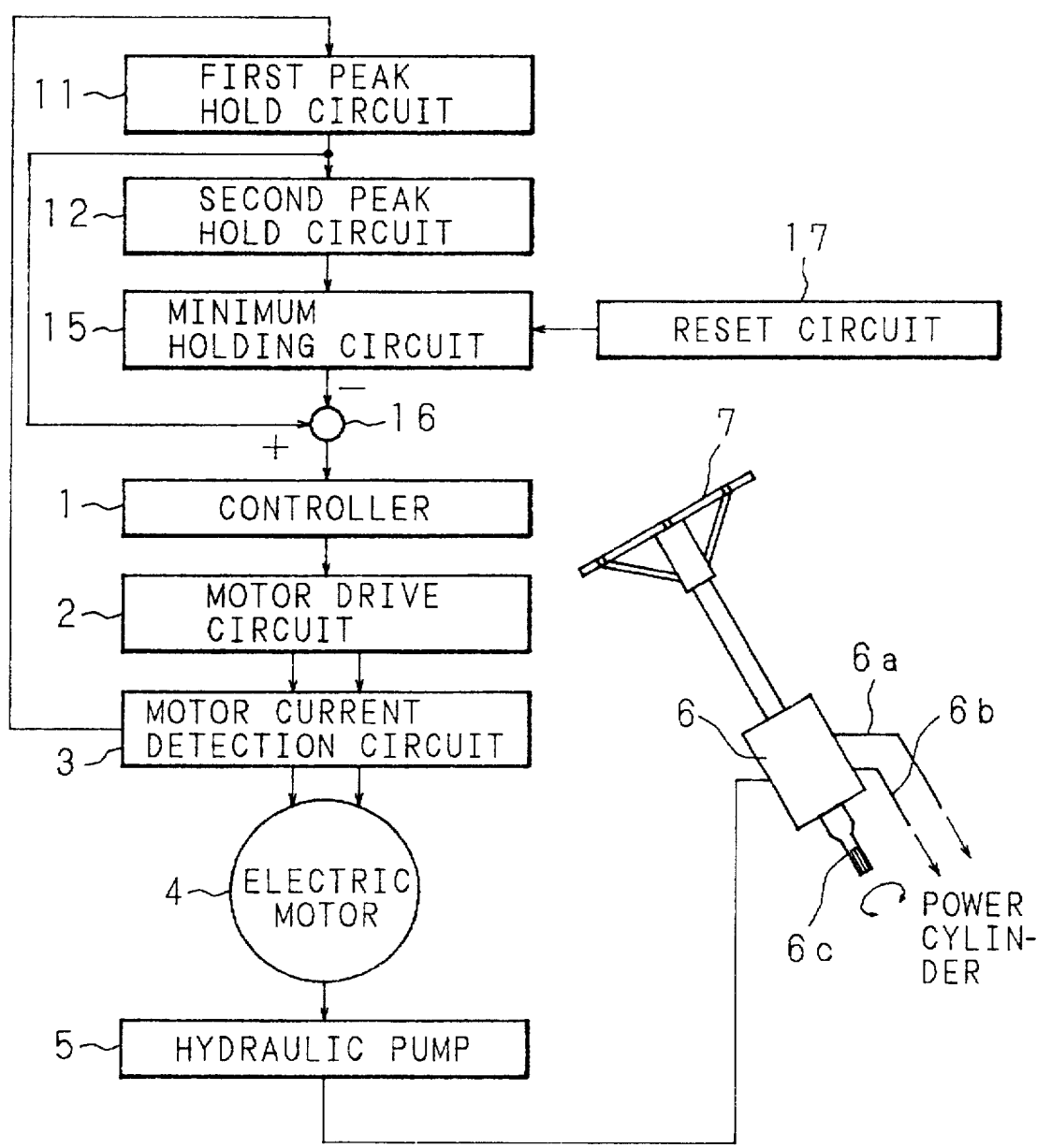
FIG. 4 is a block diagram showing a configuration of the essential parts of a power steering apparatus according to a first embodiment of the invention.

Embodiments of the invention will be described in detail below with reference to the accompanying drawings.
Embodiment 1:

FIG. 4 is a block diagram showing a configuration of the essential parts of a power steering apparatus according to the first embodiment. In this power steering apparatus, a motor drive circuit 2 rotationally drives an electric motor 4 by applying thereto a voltage indicated by a controller 1 and corresponding to a target rotational speed of the electric motor 4, and the electric motor 4 generates a working oil pressure by driving a hydraulic Pump 5.

With the manipulation of a steering wheel 7, a gear unit including a pinion gear 6c installed at the lower end of a steering shaft is activated. Then, a control valve 6 controls the pressure of the working oil transmitted under pressure to pipe lines 6a, 6b communication with a power cylinder. As a consequence, the power cylinder is energized thereby to generate a steering assisting power in an amount and direction of manipulation of the steering wheel 7.

A motor current detection circuit (load detection means) for detecting the current flowing in the electric motor 4 is interposed between the motor drive circuit 2 and the electric motor 4. The resulting motor current detection signal (load detection signal) is applied to a first peak hold circuit 11. The first peak hold circuit 11 is adapted to detect, hold and output the peak of the motor current detection signal. In the case where the motor current detection signal inputted is smaller than the signal held and outputted at that time point, output signal progressive reduction means (R1 and C1 in FIG. 9) progressively reduces the signal thus held and outputted in accordance with a predetermined characteristic (FIG. 5A). In the case where the input is larger than signal held and outputted, on the other hand, the output is rendered to follow the input.

The signal output from, the first peak hold circuit 11 is applied to a second peak hold circuit 12. The second peak hold circuit 12 is adapted to detect, hold and output the peak of the signal applied thereto. In the case where the input signal is smaller than the signal held and outputted, output signal progressive reduction means (R6 and C3 in FIG. 9) progressively reduces the signal and outputted in accordance with a predetermined characteristic (FIG. 5B). The signal held and outputted, however, is progressively reduced at a rate lower than the signal held and outputted by the first peak hold circuit 11. In the case where the input is larger than the signal held and outputted, on the other hand, the output is rendered to follow the input.

Figure 8A:
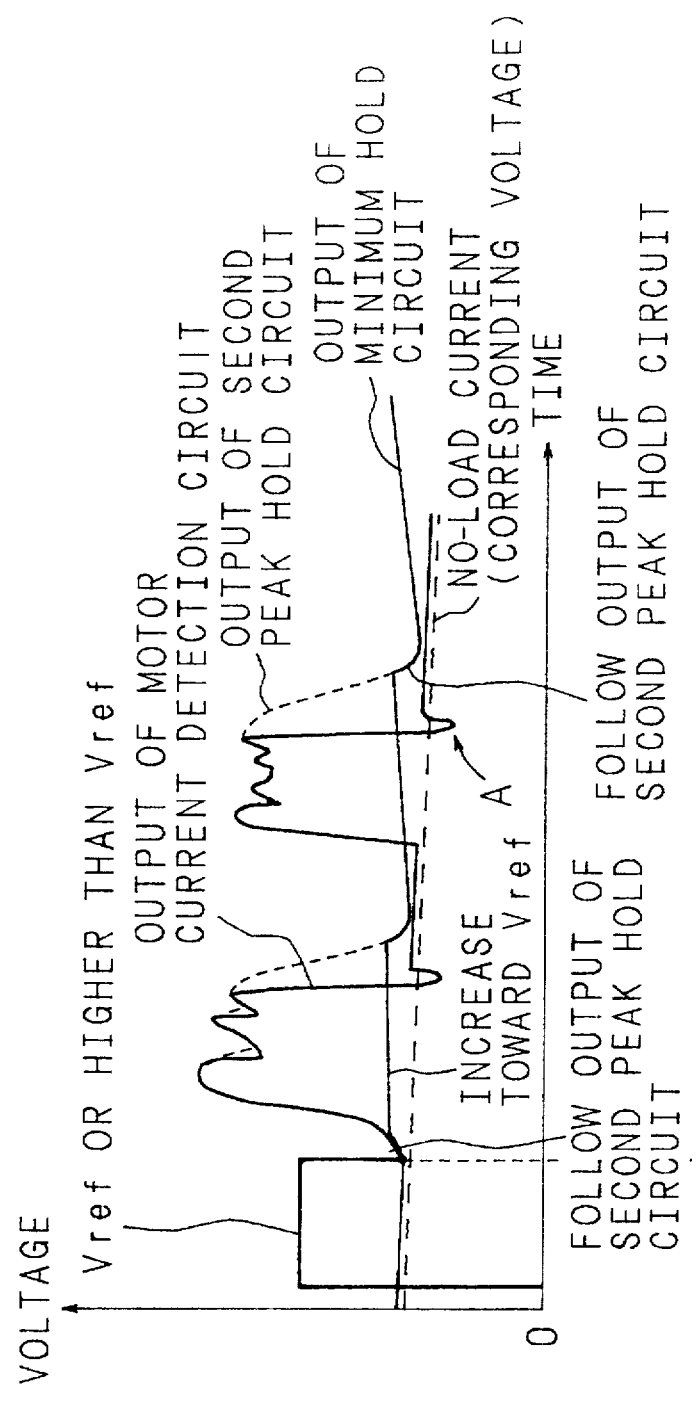
FIG. 8A is a diagram for explaining the operation of the second peak hold circuit and a minimum holding circuit shown in FIG. 4.
Figure 8B:
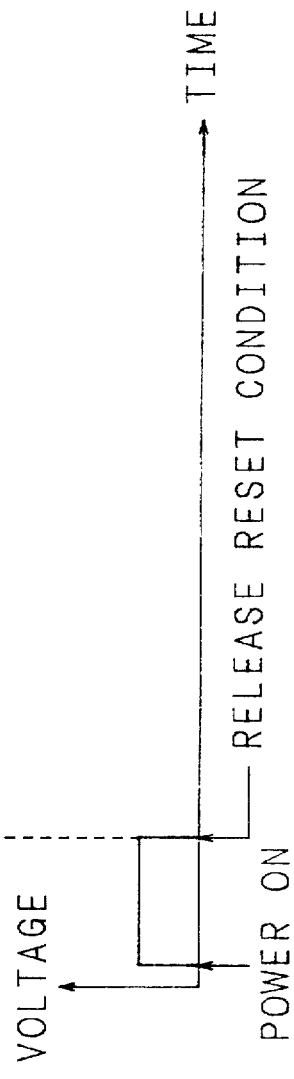
FIG. 8B is a diagram for explaining the operation of a reset circuit shown in FIG. 4.

The signal held and Outputted by the second peak hold circuit 12 is applied to a minimum holding circuit 15. The minimum. holding circuit 15 detects, holds and outputs the minimum value of the signal thus applied. In the case where the input signal is larger than the signal held and outputted, output signal progressive increasing means (R8, R9, R10 and C4 in FIG. 9) progressively increases the signal held and outputted toward a predetermined value Vref in accordance with a predetermined characteristic as shown in FIG. 8A. In the case where the input is smaller than the signal held and outputted, on the other hand, the output is rendered to follow the input. Also, the minimum holding circuit 15 is connected to a reset circuit 17 for resetting the output of the minimum holding circuit 15 at the time of operation start to a predetermined value.

The signal held and outputted by the minimum holding circuit 15 is applied to a deviation computation circuit 16. The deviation computation circuit 16 computes the deviation between the signal outputted from the first peak hold circuit 11 and the signal outputted from the minimum holding circuit 15, and applies the deviation to the controller 1. In response to this deviation, the controller 1 controls by switching the waiting rotation mode for driving the electric motor 4 at low voltage and low rotational speed on one hand and the assisted rotation mode for driving the electric motor 4 at high voltage and high rotational speed on the other hand, as shown in FIG. 6B. The controller 1 thus indicates the voltage to be applied to the electric motor 4.

The operation of a power steering apparatus having the above-mentioned configuration will be described below.

When the steering wheel 7 is not manipulated requiring no steering assisting power (when the current flowing in the electric motor 4 is small), the controller 1 outputs an indication signal for reducing the voltage to be applied to the electric motor 4 by one level and thus reduces the output of the electric motor 4 in order to suppress energy consumption, as shown in FIG. 6B (waiting rotation mode).

With the manipulation of the steering wheel 7, the control valve 6 is energized and the working oil pressure increases for an increased load, thereby increasing the current flowing in the electric motor 4. When the output (deviation) of the deviation computation circuit 16 supplied with the output from the first peak hold circuit 11 and the output from the minimum holding circuit 15 reaches a predetermined value, the controller 1 switches the motor drive control mode to assisted rotation mode and thereby increasing the output of the electric motor 4.

The first peak hold circuit 11 is adapted to detect, hold and output the peak of the motor current detection signal outputted from the motor current detection circuit 3. In the case where the input signal is smaller than the signal held and outputted, as shown in FIG. 6A, the signal held and outputted is progressively reduced in accordance with a predetermined characteristic.

FIG. 6A is a diagram showing the relationship between the motor current detection signal and the output of the first peak hold circuit 11 in the case where the threshold of the output of the first peak hold circuit 11 is set constant for switching between waiting rotation mode and assisted rotation mode.

Even when the motor current detection signal changes upward or downward in the neighborhood of a threshold level, the first peak hold circuit 11 holds and outputs the peak of the motor current detection signal, while the signal held and outputted is progressively reduced in accordance with a predetermined characteristic. Consequently, the controller 1 switches the control mode only once from waiting rotation mode to assisted rotation mode without causing any hunching, as shown in FIG. 6B. In the case where the output of the first peak hold circuit 11 drops below the threshold level as a result of progressive reduction, however, the controller 1 switches the control mode from assisted rotation mode to waiting rotation mode.

Figures 7A, 7B:
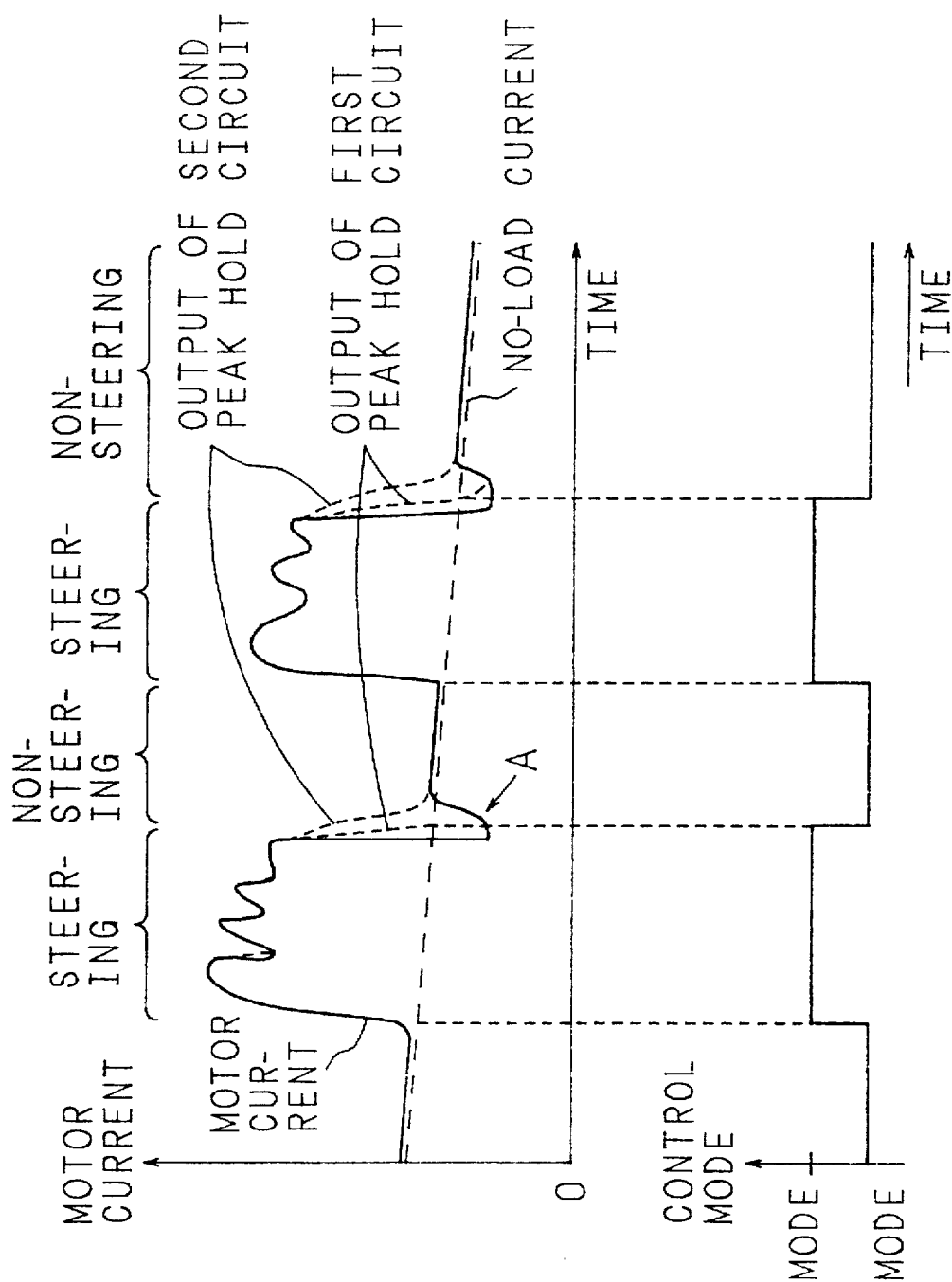
FIG. 7A is a diagram for explaining the operation of the first and second peak hold circuits shown in FIG. 4.
FIG. 7B is a diagram for explaining the control mode corresponding to FIG. 7A.

The second peak hold circuit 12 detects, holds and outputs the peak output of the first peak hold circuit 11. In the case where the input signal is smaller than the signal and outputted, however, the signal held and outputted is progressively reduced at a rate lower than the output of the first peak hold circuit 11, as shown in FIG. 7A.

As a result, the output of the second peak hold circuit 12, which is similar to the output of the first peak hold circuit 11 when the peak is detected, is reduced at a rate lower than the output of the first peak hold circuit 11 when the signal held and outputted is reduced progressively. In the output signal progressive increasing means (R8, R9 and R10 in FIG. 9) of the minimum holding circuit 15 and the second peak hold circuit 12, therefore, the component (designated by A in FIG. 7A) generated by inertial rotation of the hydraulic pump 5 at the time of transfer from assisted rotation mode (high rotational speed) to waiting rotation mode (low rotational speed) and contained in the motor current detection signal and the output of the first peak hold circuit 11 is thus removed. Such a component, therefore, is not detected by the minimum holding circuit 15.

The minimum holding circuit 15 detects, holds and outputs the minimum value of the output of the second peak hold circuit 12. In the case where the input signal is larger than the signal held and outputted, the signal held and outputted is progressively increased toward a predetermined value Vref in accordance with a predetermined characteristic (with a time constant of several tens of seconds to several minutes, for example) as shown in FIG. 8A.

The viscous resistance of oil changes with temperature, which in turn changes the load of the electric motor 4. Even in the absence of load (in the absence of steering input with the steering wheel not manipulated), therefore, the motor current detection signal (no-load current) fails to remain constant with the time elapsed from the operation start, but the no-load current undergoes a downward change with the rise of oil temperature (which is substantially fixed at a predetermined temperature) from the operation start, as shown in FIG. 7A.

Also, the viscous resistance of oil is reduced by secular variations, and therefore the no-load current changes (downward) with the lapse of time.

The minimum holding circuit 15 is capable of detecting the variations in no load current caused by the above-mentioned factors. The signal held and outputted by the minimum holding circuit 15 is progressively increased toward the predetermined value Vref in order to accommodate the increase in the no-load current due to the drop in oil temperature or the like factor. The signal outputted from the minimum holding circuit 15 is applied to the deviation computation circuit 16 for computing the deviation with the output of the first peak hold circuit 11, and the deviation (offset) thus obtained is applied to the controller 1.

This deviation contains no variation of the no-load current, and the judgement in the controller 1 judges on waiting rotation mode or assisted rotation node therefore is judged on the basis of the no-load current.

In view of the fact that the time constant for increasing the output is several tens of seconds to several minutes, for example, the minimum holding circuit 15 cannot increase the output to the level of the no-load current instantaneously at the time of operation start (when the immediately preceding input to the minimum holding circuit 15 is zero), but takes about several minutes. Hence, at the time of operation start, the reset circuit 17 resets the output of the minimum holding circuit 15 to the predetermined value Vref equal to or higher than the no-load current level as shown in FIG. 8A, and the reset condition is released within a short time (FIG. 83). The predetermined value Vref assumes a value corresponding to a conceivable maximum value (say, 15 A) of no-load current.

Figure 9:
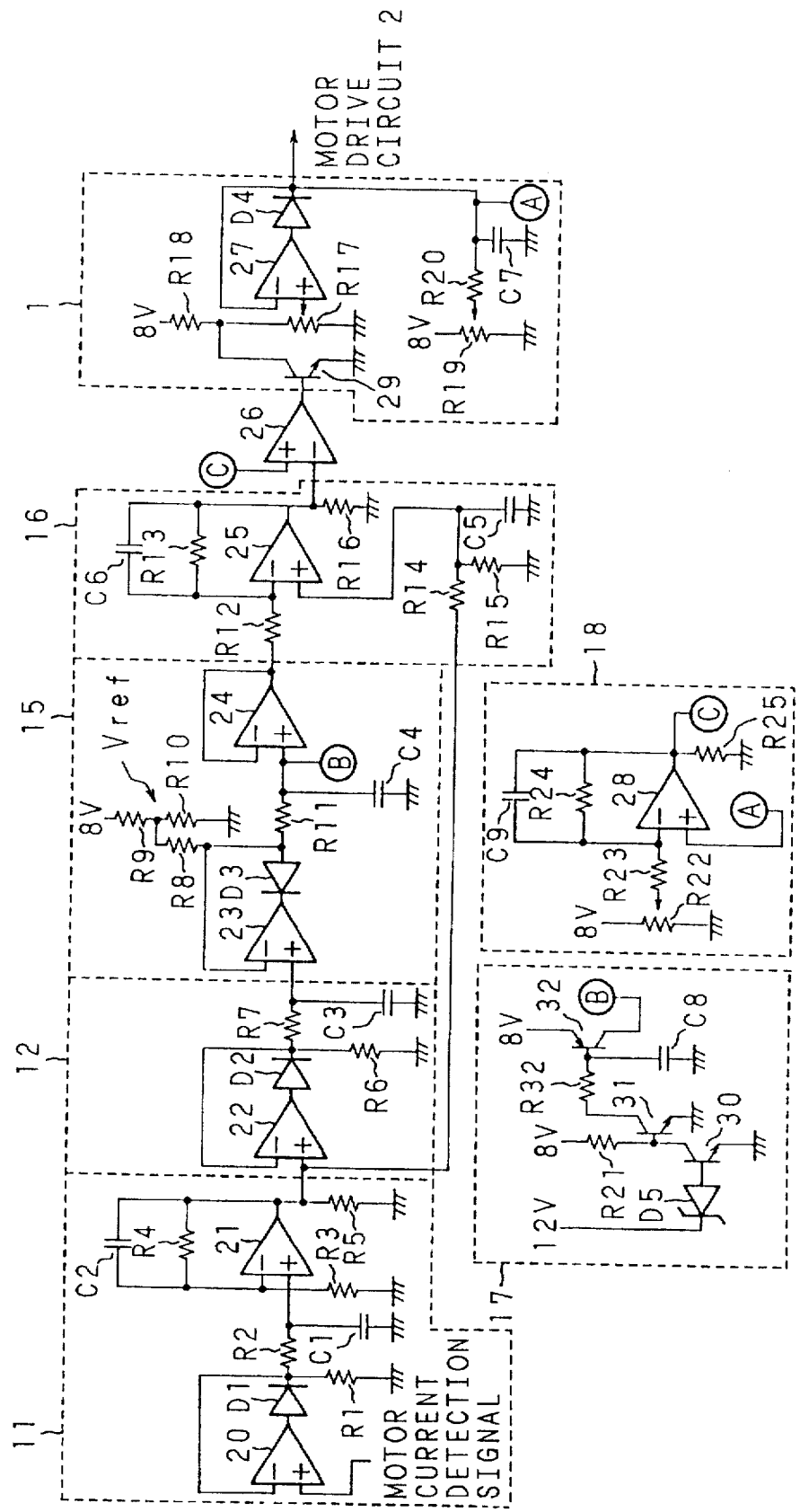
FIG. 9 is a circuit diagram showing an example circuit of the power steering apparatus in FIG. 4.

FIG. 9 shows an example circuit of the power steering apparatus described above.

In the first peak hold circuit 11, a diode D1 is connected in forward direction to the output terminal of an OP amp 20 with the non-inverting input terminal thereof supplied with a motor current detection signal. The cathode of the diode D1 is connected to the inverting input terminal of the OP amp 20 with the output thereof negatively fed back. The cathode of the diode D1 is connected to a resistance R1 with the other terminal thereof grounded on one hand and to a resistance R2 with the other terminal thereof connected to the non-inverting input terminal of the OP amp 21 on the other hand. The non-inverting input terminal of the OP amp 21, on the other hand, is connected to a capacitor C1 with the other terminal thereof grounded.

The OP amp 21 has the output thereof negatively fed back through a parallel circuit including a resistance R4 and a capacitor C2, and constitutes a differential amplifier having the inverting input terminal thereof connected to a resistance R3 with the other terminal thereof grounded. The output terminal of the OP amp 21 is connected to a resistance R5 with the other terminal thereof grounded.

The first peak hold circuit 11 would be a normal peak hold circuit in the absence of the resistance R1. With the addition of the resistance R1, however, the held and outputted signal is attenuated in accordance with the time constant determined by the resistance R1 and the capacitor C1. The signal thus attenuated is amplified by the differential amplifier of the OP amp 21 and applied to the second peak hold circuit 12.

In the second peak hold circuit 12, a diode D2 is forward connected to the output terminal of an OP amp 22 having the non-inverting input terminal thereof connected to the output terminal of the OP amp 21. The cathode of the diode D2 is connected to the inverting input terminal of the OP amp 22 with the output thereof fed back negatively. The cathode of the diode D2 is connected to a resistance R6 with the other terminal thereof grounded on one hand and to a resistance R7 having the other terminal thereof connected to the non inverting input terminal of an OP amp 23 of the minimum holding circuit 15. The non-inverting input terminal of the OP amp 23 is connected to a capacitor C3 with the other terminal thereof grounded.

The second peak hold circuit 12 would be a normal peak hold circuit in the absence of the resistance R6. As the resistance R6 is added thereto, however, the signal held and outputted is attenuated in accordance with the time constant determined by the resistance R6 and the capacitor C3. The signal thus attenuated is applied to the OP amp 23 of the minimum holding circuit 15.

In the minimum holding circuit 15, a diode D3 is reversely connected to the output terminal of the OP amp 23. The anode of the diode D3 is connected to the inverting input terminal of the OP amp 23 with the output thereof negatively fed back. The anode of the diode D3 is connected to a resistance P8, the other terminal of which is supplied with a predetermined voltage Vref which is obtained by dividing the voltage of an 8-V power source by resistors R9 and R10.

The anode of the diode D3 is connected to a resistance R11 having the other terminal thereof connected to the non-inverting input terminal of an OP amp 24. The non-inverting input terminal of the OP amp 24 in turn is connected to a capacitor C4 with the other terminal thereof grounded. The OP amp 24 is a buffer circuit with the output thereof negatively fed back.

The minimum holding circuit 15 would be a normal minimum holding circuit in the absence of the resistance R8. With the addition of the resistance R8, however, the signal held and outputted is progressively increased toward the predetermined voltage value Vref in accordance with the time constant determined by the resistance R8 and the capacitor C4. The signal thus progressively increased is applied to the deviation computation circuit 16 through the buffer circuit of the OP amp 24.

The deviation computation circuit 16 is a differential amplifier with the output thereof negatively fed back to an OP amp 25 through a parallel circuit including a resistance R13 and a capacitor C6. The output terminal of the OP amp 25 is connected to a resistance R16 with the other terminal thereof grounded.

The inverting input terminal of the OP amp 25 is supplied with the output signal of the minimum holding circuit 15 through a resistance R12. The non-inverting input terminal of the OP amp 25 on the other hand, is supplied with the output signal of the first peak hold circuit 11 through a smoothing circuit including resistors R14, R15 and a capacitor C5.

The deviation computation circuit 16 computes the deviation between the output signal of the first peal hold circuit 11 and the output signal of the minimum holding circuit 15 by means of the differential amplifier of the OP amp 25. The deviation thus computed is applied to the controller 1.

In the controller 1, the deviation computed and produced by the deviation computation circuit 16 is applied to the inverting input terminal of an OP amp 26. The OP amp 26 is a comparator having the non-inverting input terminal thereof supplied with the output of a threshold determining circuit 18 (not shown in FIG. 4) described later. The OP amp 26 turns off an NPN transistor 29 whose emitter is grounded and whose base is connected to the output terminal of the OP amp 26 when the deviation from the deviation computation circuit 16 is larger than the output of the threshold determining circuit 18, and turns on the NPN transistor 29 when the deviation from the deviation computation circuit 16 is smaller than the output of the threshold determining circuit 18.

The collector of the NPN transistor 29 is connected to a resistance R18 with the other terminal thereof connected to an 8-V power source on one hand and to a sliding resistance R17 with the other terminal thereof grounded on the other hand. The sliding terminal of the sliding resistance R17 is connected to the non-inverting input terminal of an OP amp 27. The OP amp 27 is a peak hold circuit with the output terminal thereof connected to a diode D4 in forward direction, the cathode of which is connected to the inverting input terminal of the OP amp 27 on one hand and a capacitor C7 with the other terminal thereof grounded on the other hand. The cathode of the diode D4 is also connected through a resistance R20 to the sliding terminal of a sliding resistance R19 with one terminal thereof connected to an 8-V power source and the other terminal thereof grounded.

When the NPN transistor 29 is in off state, the non inverting input terminal of the OP amp 27 is supplied with a positive potential determined by the resistance R18 and the sliding resistance R17, so that the cathode of the diode D4 is maintained at high potential. This high potential is applied to the motor drive circuit 2 (FIG. 4) as a motor control target value (a target value of the voltage applied to the electric motor 4) (assisted rotation mode).

As long as the NPN transistor 29 remains on, the junction point between the resistance R18 and the sliding resistance R17 assumes substantially zero potential. In this state, the non inverting input terminal of the OP amp 27 is supplied with substantially zero potential, and the output of the OP amp 27 assumes substantially zero potential. In the process, the cathode of the diode D4 assumes a comparatively low potential determined by the sliding resistance R19 and a resistance R20, and this low potential is applied to the motor drive circuit 2 as a motor control target value (waiting rotation mode).

The motor control target value is applied to the non-inverting input terminal of an OP amp 28 of the threshold determining circuit 18. The threshold determining circuit 18 is a differential amplifier the output of which is fed back negatively to the OP amp 28 through a parallel circuit including a resistance R24 and a capacitor C9. The output terminal of the OP amp 28 is connected to a resistance R25 with the other terminal thereof grounded.

The inverting input terminal of the OP amp 28 is connected through a resistance R23 to the sliding terminal of a sliding resistance R22 with one terminal thereof connected to an 8-V power source and the other terminal thereof grounded.

The threshold determining circuit 18 computes the difference between a motor control target value and a potential determined by the sliding resistance R22 and the resistance R23 through the differential amplifier of the OP amp 28. The difference thus computed is applied to the non-inverting input terminal of the OP amp 26 of the controller 1.

In the reset circuit 17, the anode of a Zener diode D5 having the cathode thereof supplied with a 12-V power source is connected to the base of an NPN transistor 30 with the emitter grounded. The collector of the NPN transistor 30 is connected to a resistance R21 with the other terminal thereof connected to an 8-V power source on one hand and to the base of an NPN transistor 31 with the emitter grounded on the other hand.

The collector of the NPN transistor 31 is connected to a capacitor C8 with the other terminal thereof grounded and also to a resistance R32 with the other terminal thereof connected to the base of a PNP transistor 32. The emitter of the PNP transistor 32 is connected to an 8-V power source, and the collector thereof is connected to the non-inverting input terminal of the OP amp 24 (buffer circuit) of the minimum holding circuit 15.

When power is switched on at the time of operation start, the NPN transistors 30 and 31 in the reset circuit 17 turn on, and so does the PNP transistor 32. A potential of about 8-V is thus applied to the non-inverting input terminal of the OP amp 24. In spite of this, the capacitor C8 is charged by the base current of the PNP transistor 32 limited by the resistance R32, and with the increase in the base potential of the PNP transistor 32, the PNP transistor 32 turns off, with the result that the potential of the non-inverting input terminal of the OP amp 24 assumes the same level as at the junction point between the resistance R11 and the capacitor C4.

Figure 10A:
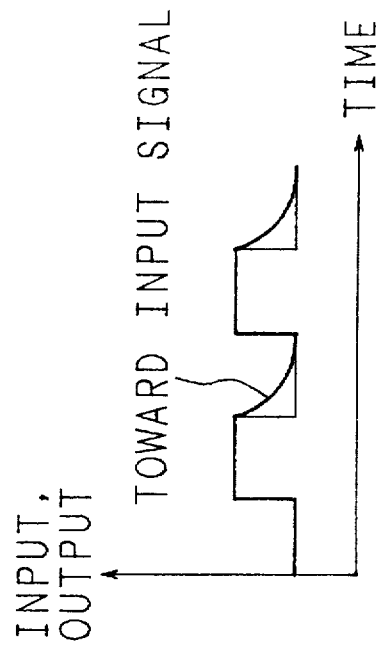
FIG. 10A is a circuit diagram showing a modification of a peak hold circuit.

FIG. 10A shows a modification of the first peak hold circuit 11 and the second peak hold circuit 12. In the peak hold circuits, the non-inverting input terminal of an OP amp 33 is supplied with a signal with the peak thereof to be detected, and the output terminal of the OP amp 33 is connected with a diode D6 in forward direction. The diode D6 is connected in parallel to a resistance R26, and the cathode of the diode D6 is connected to the inverting input terminal of the OP amp 33 with the output thereof negatively fed back. Also, the cathode of the diode D6 is connected to a capacitor D10 with the other terminal thereof grounded, and the signal held and outputted of the peak hold circuit is outputted from the cathode of the diode D6.

Figure 10B:
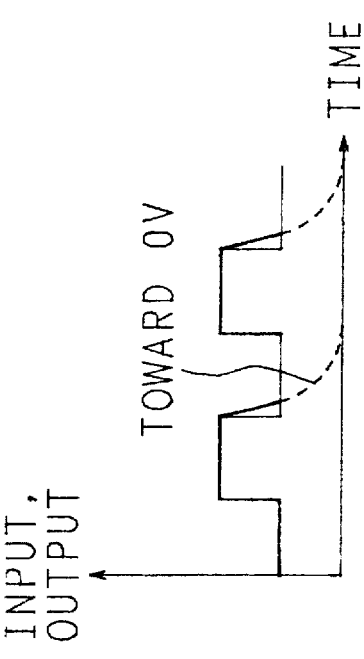
FIG. 10B is a waveform diagram for the peak hold circuit shown in FIG. 10A.

The output signal of the peak hold circuit is attenuated toward the input signal (the output signal of the OP amp 33) due to the current flowing in the resistance R26 (output signal progressive reduction means) in accordance with the time constant determined by the resistance R26 and the capacitor C10 as shown in FIG. 10B (input and output represented by thin and thick lines respectively, as applicable similarly in the description that follows).

Figure 10C:
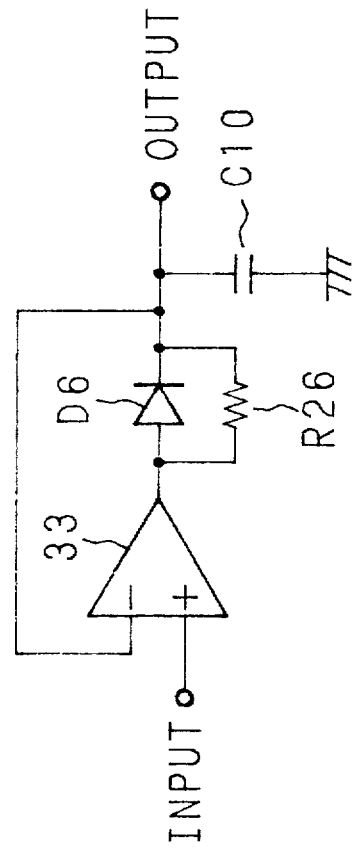
FIG. 10C is a circuit diagram showing a modification of the peak hold circuit.

FIG. 10C shows another modification of the first peak hold circuit 11 and the second peals hold circuit 12. With this peal hold circuit, a signal with the peak thereof to be detected is applied to the non-inverting input terminal of a OP amp 34, a the diode D7 is connected in forward direction to the output terminal of the OP amp 34. The cathode of the diode D7 is connected to the inverting input terminal of the OP amp 34 with the output thereof negatively fed back. Also, the cathode of the diode D7 is connected to a capacitor C11 with the other terminal thereof grounded on one hand and to a resistance R27 with the other terminal grounded. The output signal of the peak hold circuit is produced from the cathode of the diode D7.

Figure 10D:
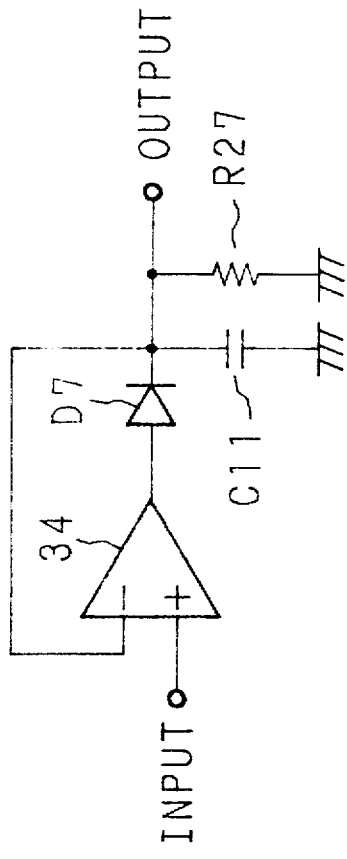
FIG. 10D is a waveform diagram for the peak hold circuit shown in FIG. 10C.

The output signal of the peak hold circuit is attenuated toward the 0-V potential in accordance with the time constant determined by the resistance R27 and the capacitor C11 as shown in FIG. 10D due to the current flowing in the resistance R27 (output signal progressive reduction means).

Figure 11B:
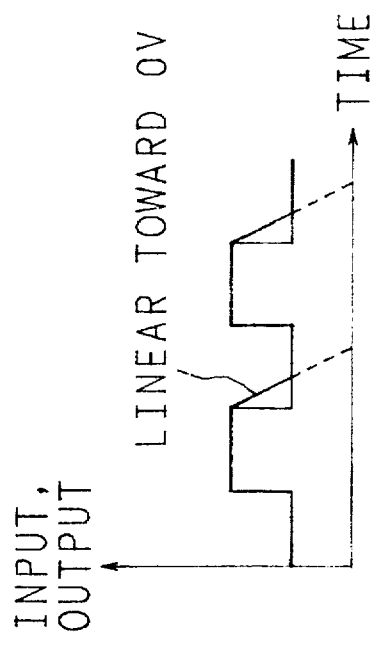
FIG. 11B is a waveform diagram for the peak hold circuit shown in FIG. 11A.
Figure 11D:
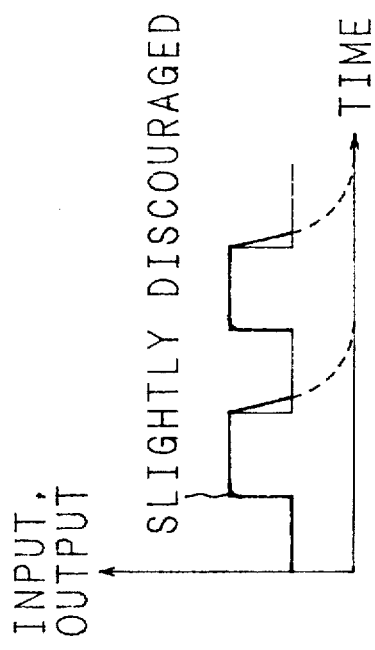
FIG. 11D is a waveform diagram for the peak hold circuit shown in FIG. 11C.
Figure 11A:
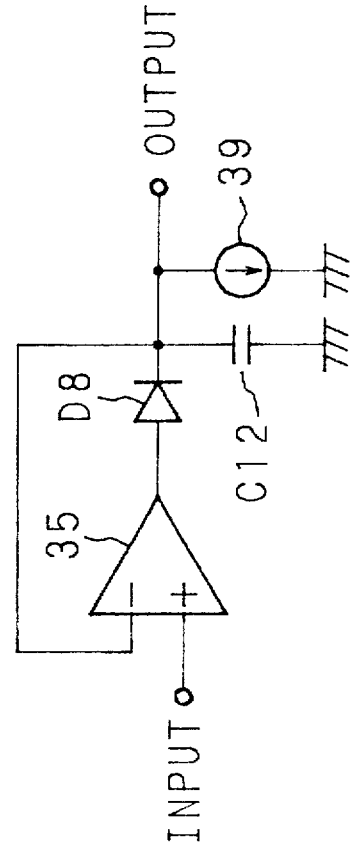
FIG. 11A is a circuit diagram showing a modification of the peak hold circuit.

FIG. 11A shows another modification of the first peak hold circuit 11 and the second peak hold circuit 12. In this modification of the peak hold circuit, the non-inverting input terminal of an OP amp 35 is supplied with a signal with the peak thereof to be detected, and a diode D8 is forwardly connected to the output terminal of the OP amp 35. The cathode of the diode D8 is connected to the inverting input terminal of the OP amp 35 with the output thereof negatively fed back. Also, the cathode of the diode D8 is connected to a capacitor C12 with the other terminal thereof grounded and also to a constant current source 39 with the other terminal thereof grounded. The output signal of the peak hold circuit is produced from the cathode of the diode D8.

The output signal of the peak hold circuit is attenuated toward the input signal (the output signal of the OP amp 35) in accordance with a linear characteristic having an inclination angle determined by the capacitor C12 and the constant current of the constant current source 39 as shown in FIG. 11B due to the constant current of the constant current source 39 (output signal progressive reduction means).

Figure 11C:
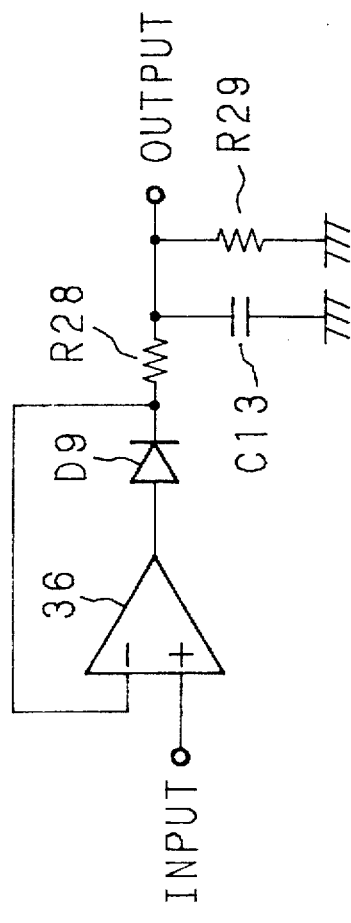
FIG. 11C is a circuit showing a modification of the peak hold circuit.

FIG. 11C shows still another modification of the first peak hold circuit 11 and the second peak hold circuit 12. In this modification of the peak hold circuit, the non-inverting input terminal of an OP amp 36 is supplied with a signal with the peak thereof to be detected, and a diode D9 is forwardly connected to the output terminal of the OP amp 36. The cathode of the diode D9 is connected to the inverting input terminal of the OP amp 36 with the output thereof negatively fed back. Also, the cathode of the diode D9 is connected through a resistance R28 to a capacitor C13 with the other terminal thereof grounded and a resistance R29 with the other terminal thereof also grounded. The output signal of the peak hold circuit is produced from the junction point between the resistance R28, the capacitor C13 and the resistance R29 (it is assumed that R28 << R29).

The output signal from the peak hold circuit, as shown in FIG. 11D, is slightly discouraged by the operation of the resistance R28 and the capacitor C13 at the rising edge of the input signal, followed by being attenuated toward the 0-V potential in accordance with the time constant determined by the resistance R29 (output signal progressive reduction means) and the capacitor C13 at the falling of the input signal.

Figure 12:
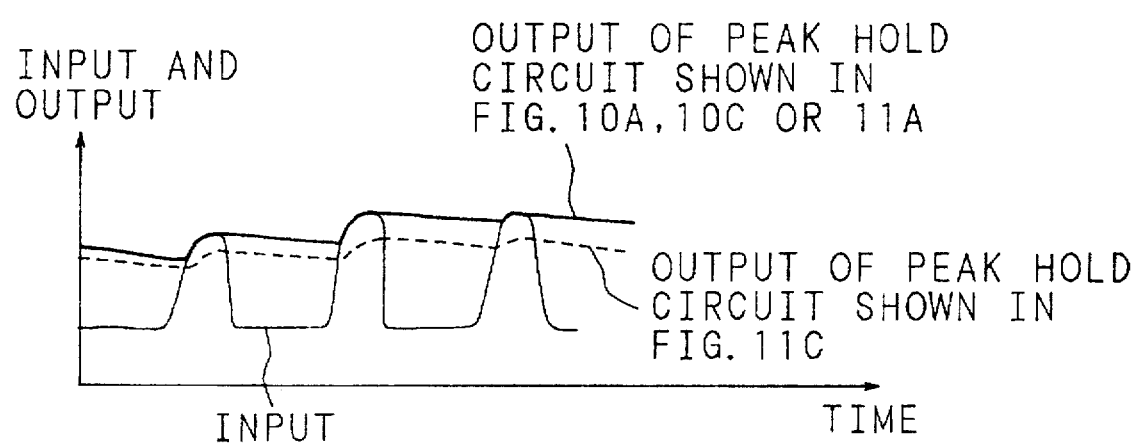
FIG. 12 is a waveform diagram showing the operation of each peak hold circuit.

The peak hold circuit constituted by adding the resistance R28 to the peak hold circuit shown in FIG. 10C reduces the output ripple (variation width) of the peak hold circuit attributable to the response of the OP amp, thereby leading to a greater smoothing effect as shown in FIG. 12.

Figure 13B:
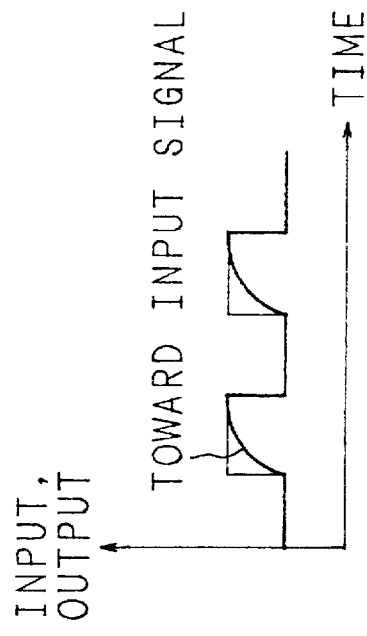
FIG. 13B is a waveform diagram for the minimum holding circuit shown in FIG. 13A.
Figure 13D:
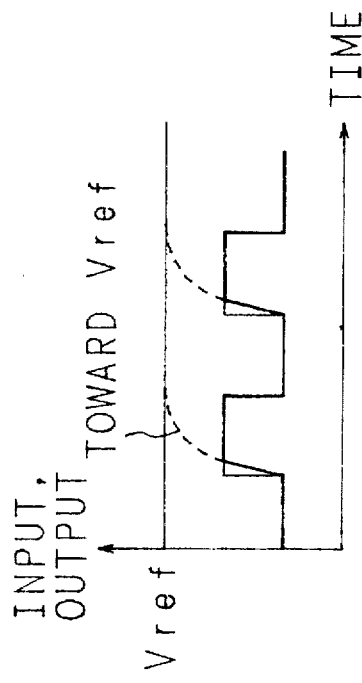
FIG. 13D is a waveform diagram for the minimum holding circuit shown in FIG. 13C.
Figure 13A:
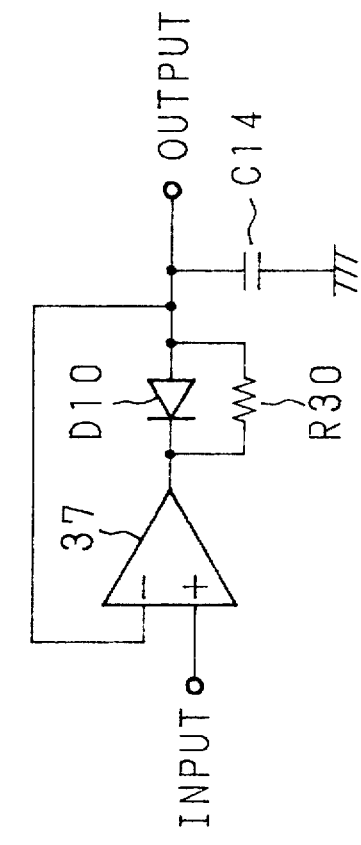
FIG. 13A is a circuit diagram showing a modification of the minimum holding circuit.

FIG. 13A shows a modification of the minimum holding circuit 15. With this modification of the minimum holding circuit, a signal with the minimum value thereof to be detected is applied to the non inverting input terminal of an OP amp 37, and a diode D10 is reversely connected to the output terminal of the OP amp 37. The diode D10 is connected in parallel to a resistance R30, and the anode of the diode D10 is connected to the inverting input terminal of the OP amp 37 with the output thereof negatively fed back. Also, the anode of the diode D10 is connected to a capacitor C14 with the other terminal thereof grounded, and the output signal of the minimum holding circuit is outputted from the anode of the diode D10.

The output signal of this minimum holding circuit is increased toward the input signal (the output signal of the OP amp 37) in accordance with tie time constant determined by the resistance R30 and the capacitor C14 as shown in FIG. 13B due to the current divided by the resistance R30 (the output signal progressive increase means).

Figure 13C:
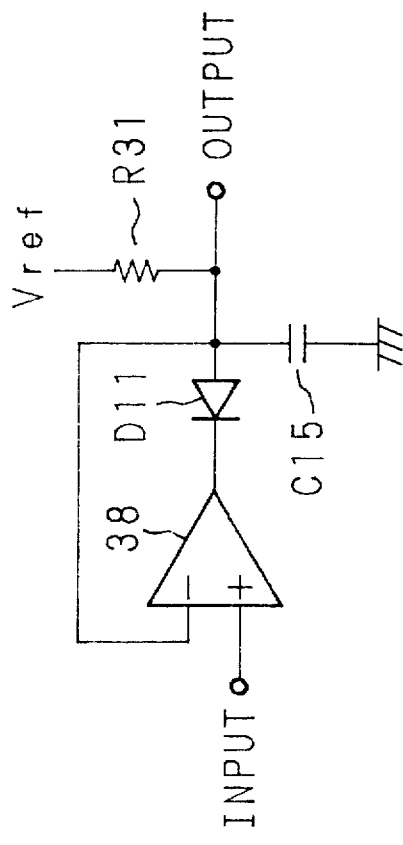
FIG. 13C is a circuit diagram showing a modification of the minimum holding circuit.

Another modification of the minimum holding circuit 15 is shown in FIG. 13C. In this minimum holding circuit, a signal with the minimum value thereof to be detected is applied to the non-inverting input terminal of an OP amp 38, and a diode D11 is reversely connected to the output terminal of the OP amp 38. The anode of the diode D11 is connected to the inverting input terminal of the OP amp 38 with the output thereof fed back negatively. Also, the anode of the diode D11 is connected to a capacitor C15 with the other terminal thereof grounded on one hand and to a resistance R31 with the other terminal thereof supplied with a predetermined potential Vref. The output signal of the minimum holding circuit is produced from the anode of the diode D11.

The output signal of the minimum holding circuit is increased toward the predetermined potential Vref (the upper limit of which is the input signal (the output signal of the amplifier 38)) in accordance with the time constant determined by the resistance R31 (output signal progressive increase means) and the capacitor C15 as shown in FIG. 13D due to the current flowing in the resistance R31.

Figure 14:
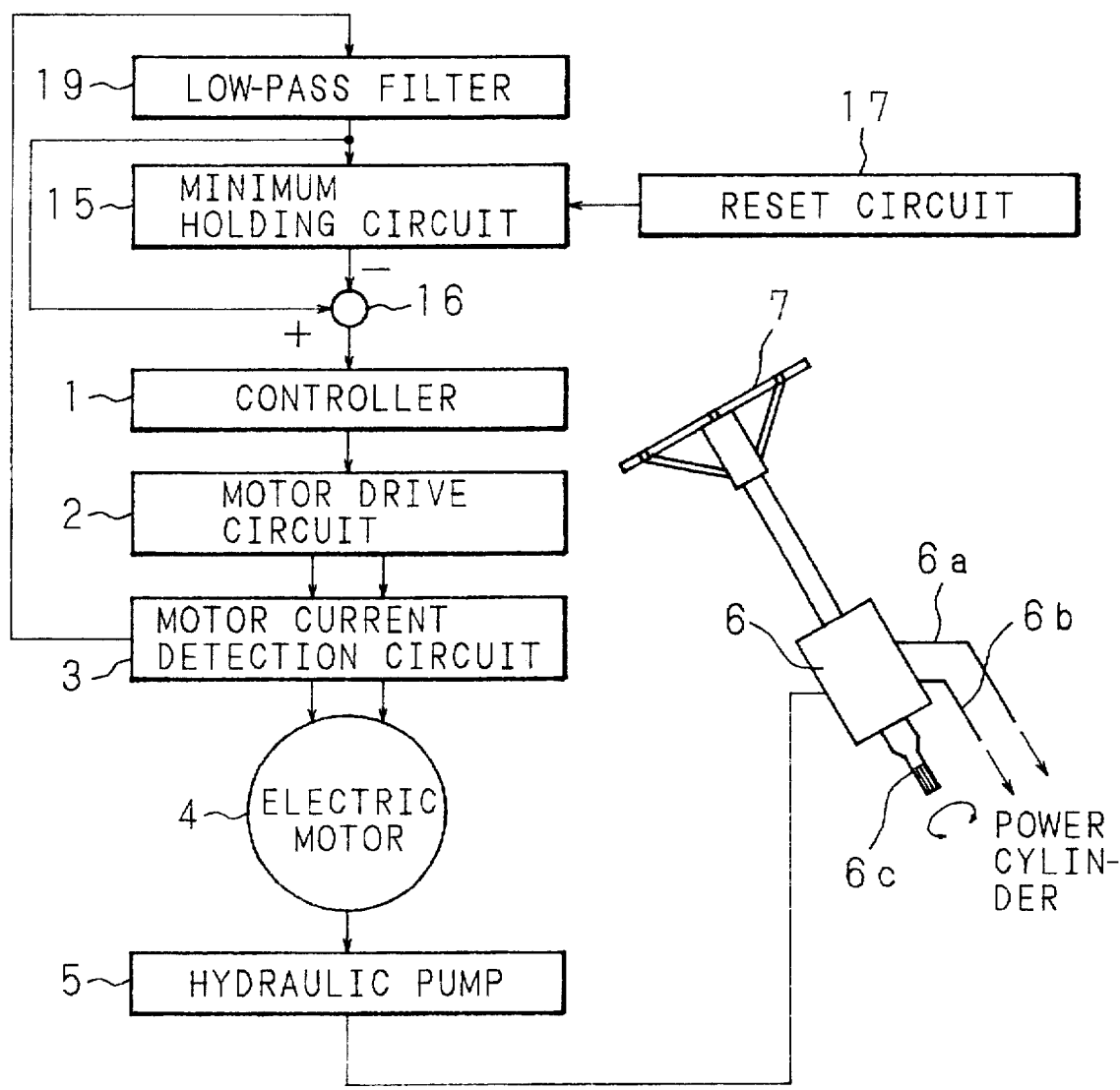
FIG. 14 is a block diagram showing a configuration of the essential parts of a power steering apparatus according to a second embodiment of the invention.

Embodiment 2:

FIG. 14 is a block diagram showing a configuration of the essential parts of a power steering apparatus according to a second embodiment. In this power steering apparatus, a motor drive circuit 2 applies a voltage to and rotationally drives an electric motor 4 in accordance with the voltage applied thereto corresponding to a target rotational speed of the electric motor 4 designated by a controller 1, so that the electric motor 4 generates a working oil pressure by driving a hydraulic pump 5.

With the steering wheel 7 manipulated activating a gear unit including a pinion gear 6c installed at the lower end of a steering wheel shaft, a control valve 6 controls the pressure of the working oil transmitted under pressure to pipe lines 6a, 6b communication with a power cylinder. As a result, the power cylinder is activated, thereby generating a steering assisting power in an amount and direction in which the steering wheel 7 is manipulated.

A motor current detection circuit 3 (load detection means) is provided between the motor drive circuit 2 and the electric motor 4 for detecting the current flowing in the electric motor 4. The resulting motor current detection signal is applied to a low-pass filter 19, which is for smoothing the motor current detection signal in the manner shown in FIG. 15.

The motor current detection signal smoothed by the low-pass filter 19 is applied to the minimum holding circuit 15. The minimum holding circuit 15 in turn detects, holds and outputs the minimum value of the input signal. In the process, in the case where the input signal is larger than the signal thus held and outputted, the signal held and outputted is progressively increased by the output signal progressive increase means toward a predetermined value Vref in accordance with a predetermined characteristic as shown in FIG. 8A. In the case where the input is smaller than the signal held and outputted, on the other hand, the output is made to follow the input.

Also, the minimum holding circuit 15 is connected to a reset circuit 17 for resetting the output of the minimum holding circuit 15 at the time of operation start to a predetermined value.

The signal outputted from the minimum holding circuit 15 is applied to a deviation computation circuit 16. In the deviation computation circuit 16, a deviation between the motor current detection signal smoothed by the low-pass filter 19 and the output signal of the minimum holding circuit 15 is computed and applied to the controller 1. By use of this deviation, the controller 1 controls by switching between the waiting rotation mode for driving the electric motor 4 at low rotational speed and the assisted rotation mode for driving the electric motor 4 at high rotational speed, as shown in FIG. 16, thereby indicating the voltage to be applied to the electric motor 4.

Now, the operation of the power steering apparatus having the above-mentioned configuration will be described below.

Figure 16:
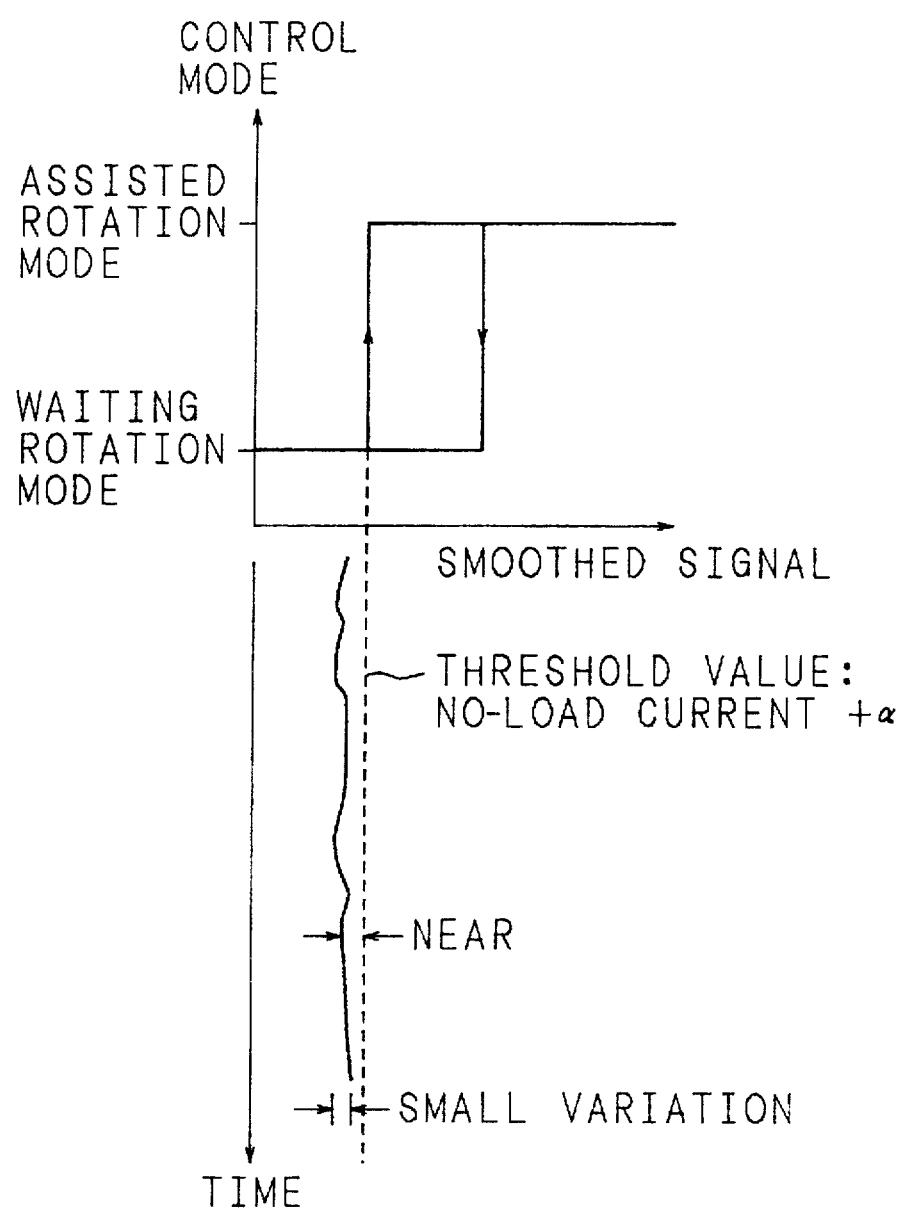
FIG. 16 is a diagram for explaining the operation of the power steering apparatus shown in FIG. 14.

In the case where the steering wheel 7 is not manipulated and therefore no steering assisting power is required (when the current flowing in the electric motor 4 is small), the controller 1 outputs an indication signal designating a low target rotational speed of the electric motor 4 as shown in FIG. 16, thereby reducing the output of the electric motor 4 (waiting rotation mode), in order to suppress energy consumption.

With the manipulation of the steering wheel 7, by contrast, the control valve 6 is energized, and the working oil pressure increases with an increased load, thereby increasing the current flowing in the electric motor 4. When a predetermined value is reached by the output (deviation) of the deviation computation circuit 16 supplied with the output signal of the low-pass filter 19 impressed with the motor current detection signal of the motor current detection circuit 3 on one hand and the output signal of the minimum holding circuit 15 supplied with the output signal of the low-pass filter 19, then the controller 1 switches the motor drive control mode to assisted rotation mode, thereby increasing the output of the electric motor 4.

The low-pass filter 19 smoothes the motor current detection signal outputted from the motor current detection circuit 3. The minimum holding circuit 15 detects, holds and outputs the minimum value of the output signal of the low-pass filter 19. In the case where the input signal is larger than the signal thus held and outputted, as shown in FIG. 8A, the signal held and outputted is progressively increased toward the predetermined value Vref in accordance with a predetermined characteristic (with a time constant of several tens of seconds to several minutes, for example). The other operations of the minimum holding circuit 15 and the reset circuit 17, which are similar to those of the minimum holding circuit 15 and the reset circuit 17, respectively, of the power steering apparatus according to the first embodiment, will not be explained any more.

The signal outputted from the minimum holding circuit 15 is applied to the deviation computation circuit 16, where the deviation between this signal and the signal outputted from the low-pass filter 19 is computed and applied to the controller 1. This deviation has the variations of the no-load current, and therefore the judgment between waiting rotation mode and assisted rotation mode at the controller 1 is made based on the no-load current.

Figure 15:
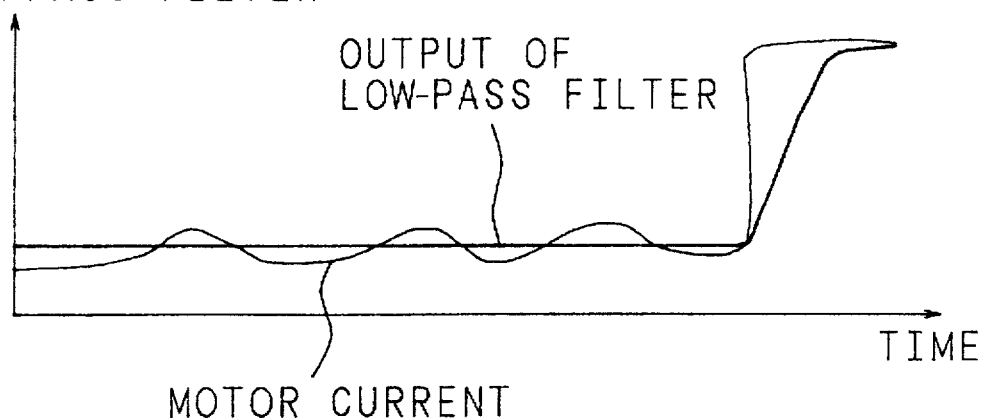
FIG. 15 is a waveform diagram showing the operation of a low-pass filter in FIG. 14.

Further, in the low-pass filter 19, the motor current detection signal outputted from the motor current detection circuit 3 is smoothed and reduced in variation width as shown in FIG. 15. The hunching of steering assistance, therefore, can be reduced, while at the same time the threshold value for controlling by switching between waiting rotation mode and assisted rotation mode of the controller 1 can be made to approach the no load current as shown in FIG. 16, thereby improving the steering assistance response.

Figure 17:
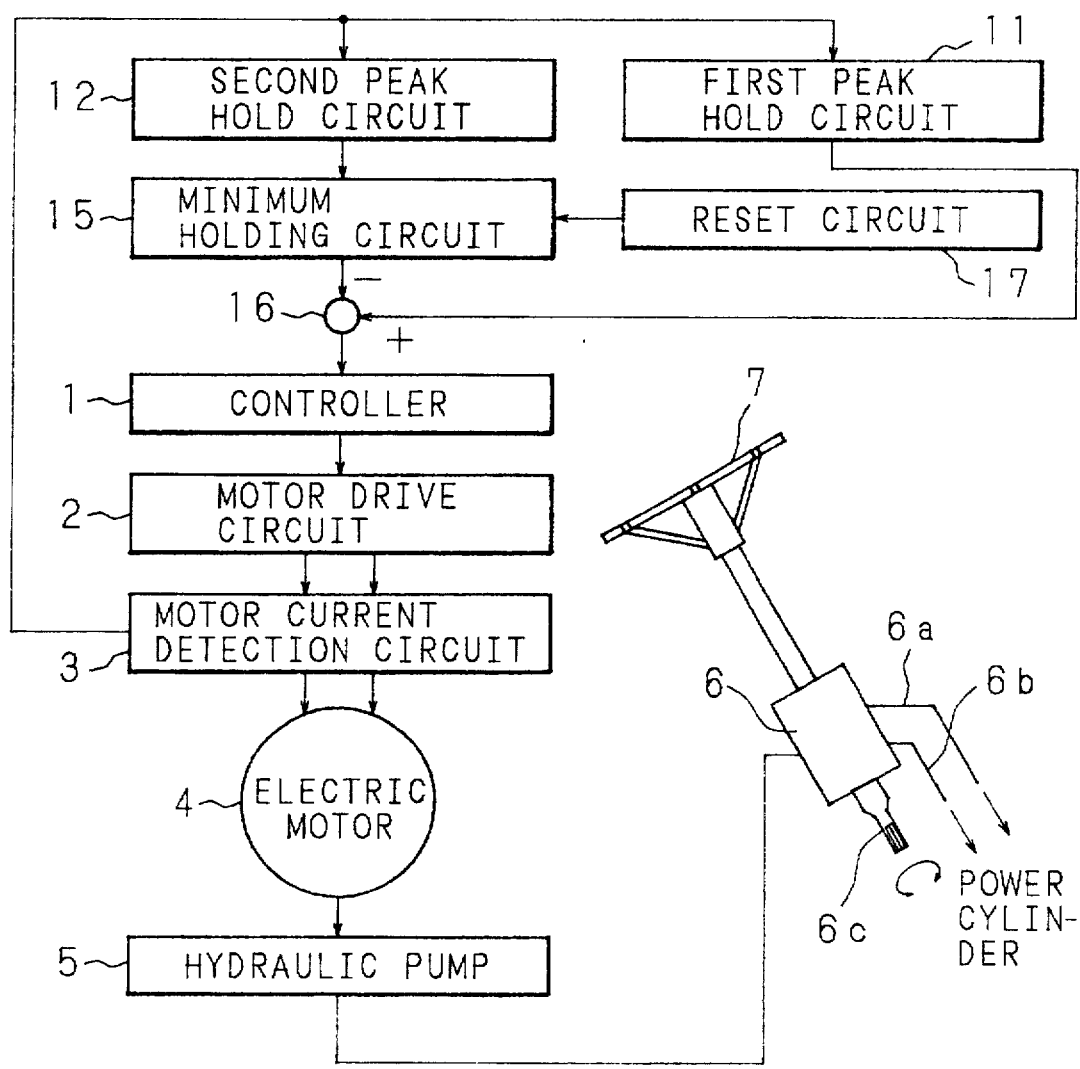
FIG. 17 is a block diagram showing a configuration of the essential parts of a power steering apparatus according to a third embodiment of the invention.

Embodiment 3:

FIG. 17 is a block diagram showing a configuration of the essential parts of a power steering apparatus according to a third embodiment. In this power steering apparatus, a motor current detection signal outputted from a motor current detection circuit 3 (load detection means) is applied to a first peak hold circuit 11. The first peak hold circuit 11 detects, holds and outputs the peak of this motor current detection signal. In the process, assuming that the motor current detection signal thus inputted is smaller than the signal held and outputted, the output signal progressive reduction means progressively decreases the signal held and outputted in the first peak hold circuit 11 in accordance with a predetermined characteristic (FIG. 5A). The signal outputted from the first peak hold circuit 11 is applied to the deviation computation circuit 16.

The motor current detection signal outputted from the motor current detection circuit 3 (load detection means) is also applied to the second peak hold circuit 12. The second peak hold circuit 12 detects, holds and outputs the peak of the signal input thereto. In the case where the inputted signal is smaller than the signal thus held and outputted, the Output signal progressive reduction means progressively reduces the signal held and outputted in accordance with a predetermined characteristic (FIG. 5B). The signal thus held and outputted, however, is reduced at a rate lower than for the signal held and outputted by the first peal hold circuit 11. The remaining parts of the configuration are similar to the corresponding parts of the power steering apparatus according to the first embodiment, and therefore will not be described again.

The operation of the power steering apparatus having the configuration described above will be explained below.

When the steering wheel 7 is not manipulated and therefore the steering assisting power is not required (when the current flowing in the electric motor 4 is small), the controller 1 outputs an indication signal specifying a target rotational speed of tho electric motor 4 to a low level as shown in FIG. 6B in order to suppress the energy consumption, thereby reducing the output of the electric motor 4 (waiting rotation node).

With the manipulation of the steering wheel 7, on the other hand, the control valve 6 is energized, and the working pressure oil increases for an increased load, thereby increasing the current flowing in the electric motor 4. When a predetermined value of the deviation computed by the deviation computation circuit 16 is reached between the output signal of the first peak hold circuit 11 and the output signal of the minimum holding circuit 15, then the controller 1 switches the motor drive control mode to assisted rotation mode and thereby increases the output of the electric motor 4.

The first peak hold circuit 11 detects, holds and outputs the peak of the motor current detection signal outputted from the motor current detection circuit 3. In the case where the input signal is smaller than the signal held and outputted, the signal held and outputted is progressively reduced in accordance with a predetermined characteristic as shown in FIG. 6A.

FIG. 6A shows the relationship between the motor current detection signal and the output of the first peak hold circuit 11 in the case where the threshold value of the output of the first peak hold circuit 11 for switching between waiting rotation mode and assisted rotation mode is kept constant. Even in the case where the motor current a detection signal undergoes an upward or downward variation in the neighborhood of the threshold value, the first peak hold circuit 11 holds and outputs the peak of the motor current detection signal. The signal held and outputted, however, is progressively reduced in accordance with a predetermined characteristic. As a result, as shown in FIG. 6B, the controller 1 switches the control mode only once from waiting rotation mode to assisted rotation mode without causing any hunching. In the case where the output of the first peak hold circuit 11 is progressively reduced to a level below the threshold value, oil the other hand, the controller 1 switches the control mode from assisted rotation mode to waiting rotation mode.

The second peak hold circuit 12 detects, holds and outputs the peak of the motor current detection signal outputted from the motor current detection circuit 3. In the case where the input signal is smaller than the signal held and outputted, the signal held and outputted is progressively reduced at a rate lower than the output of the first peak hold circuit 11 is reduced, as shown in FIG. 7. Consequently, the output of the second peak hold circuit 12, which remains similar to the output of the first peak hold circuit 11 as long as the peak is detected, is progressively reduced at a rate lower than the output of the first peak hold circuit 11 is reduced.

The second peak hold circuit 12 and the output signal progressive reduction means eliminates the signal component (designated by A in FIG. 7A) contained in the output of the motor current detection signal and generated by inertial rotation of the hydraulic pump 5 and the electric motor 4 at the time of transfer (FIG. 7B) from assisted rotation mode (high speed rotation) and waiting rotation mode (low speed rotation). The minimum holding circuit 15 thus fails to detect the particular signal component. The remaining operations are similar to the corresponding operations of the power steering apparatus according to the first embodiment, and therefore will not described in more detail.

Figure 18:
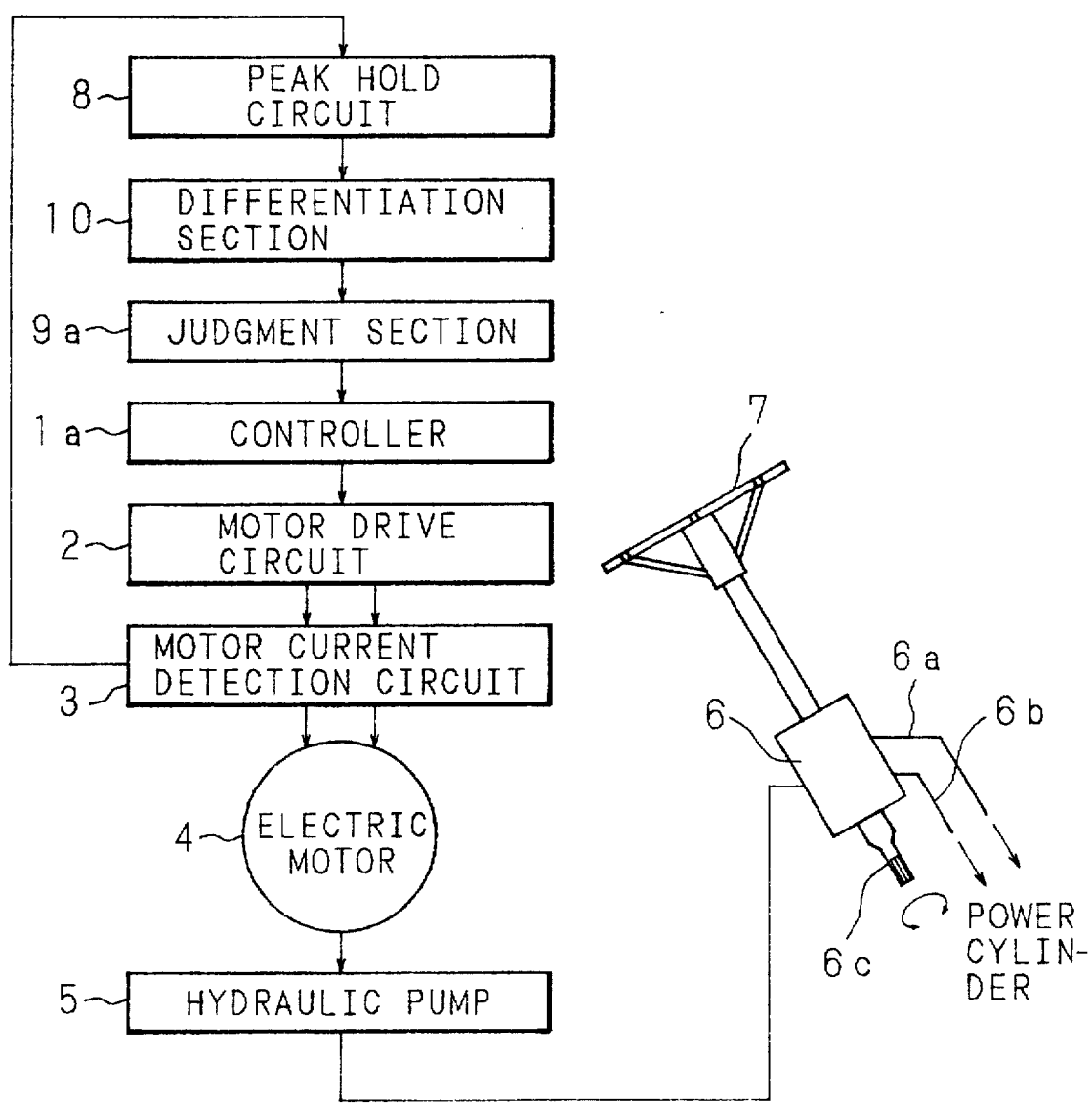
FIG. 18 is a block diagram showing a configuration of the essential parts of a power steering apparatus according to a fourth embodiment of the invention.

Embodiment 4:

FIG. 18 is a block diagram showing a configuration of the essential parts of a power steering apparatus according to a fourth embodiment. With this power steering apparatus, a motor drive circuit 2 rotationally drives by applying a voltage to an electric motor 4 in accordance with a voltage applied thereto corresponding to a target rotational speed of the electric motor 4 designated by a controller 1a, and the electric motor 4 thus generates a working oil pressure by driving a hydraulic pump 5.

With the manipulation of the steering wheel 7 and the resulting operation of a gear unit including a pinion gear 6c mounted at the lower end of a steering shaft, a control valve 6 controls the pressure of the working oil sent under pressure to pipe lines 6a, 6b communicating with a power cylinder. Consequently, the power cylinder is energized, and a steering assisting power is generated in an amount and direction in which the steering wheel 7 is manipulated.

A motor current detection circuit 3 is interposed between the motor drive circuit 2 and the electric motor 4 for detecting the current flowing in the electric motor 4. The motor current detection signal is applied to a peak hold circuit 8 where the peak of the signal is held and outputted, followed by being applied to a differentiation circuit 10. The differentiation circuit 10 differentiates the signal thus held and outputted, and the signal thus differentiated (parameter computation value) is applied to a judgment section 9a. The judgment section 9a judges on the relative magnitudes between the differentiated value and a predetermined value, and applies the result of judgment to the controller 1a. The controller 1a designates a target rotational speed of the electric motor 4 in accordance with the judgment.

The peak hold circuit 8 detects, holds and outputs the peak of the motor current detection signal outputted from the motor current detection circuit 3. In the case where the input signal is smaller than the signal thus held and outputted, the signal held and outputted is progressively decreased by the output signal progressive reduction means in accordance with a predetermined characteristic, as shown in FIG. 19C.

The operation of the power steering apparatus having the above-mentioned configuration will be described below.

Figure 22:
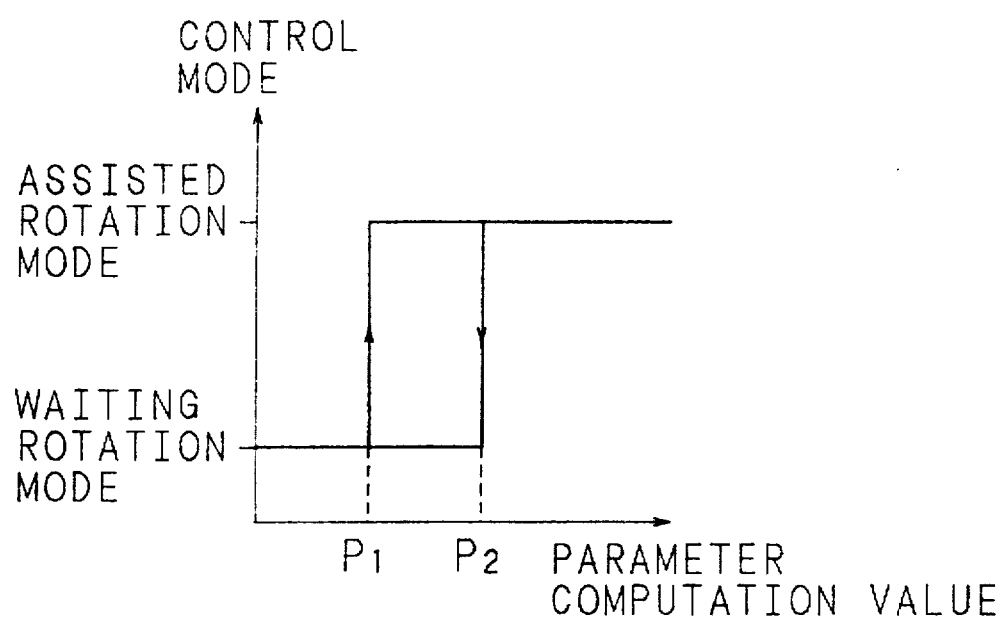
FIG. 22 is a diagram for explaining the operation of the power steering apparatus shown in FIGS. 18 and 20.

When the steering wheel 7 is not manipulated and therefore no steering assisting power is required (i.e., when the current flowing in the electric motor 4 is small), the controller 1a outputs an indication signal for setting the target rotational speed of the electric motor 4 to a low level and thus reduces the output of the electric motor 4 in order to suppress energy consumption, as shown in FIG. 22 (waiting rotation mode).

A peak hold circuit 8 detects the peak of the motor current detection signal outputted from the motor current detection circuit 3, and holds and outputs the value thus detected. In the case where the input signal is smaller than the signal held and outputted, the signal held and outputted is progressively reduced in accordance with a predetermined characteristic. A differentiation section 10 normally differentiates the output signal of the peak hold circuit 8 and applies the differentiated value to a judgment section 9a. The judgment section 9a judges the relative magnitudes of the differentiated value and a predetermined value, and applies the result of judgment to the controller 1a.

With the manipulation of the steering wheel 7, a control valve 6 is energized and the working oil pressure increases for an increased load, thereby increasing the current flowing in the electric motor 4. When the motor current detection signal outputted from the motor current detection circuit 3 thus increases, the output signal of the peak hold circuit 8 also increases, resulting in an increased value of the signal held and outputted which is differentiated by the differentiation section 10. When this differentiated value (parameter computation value) increases to a value in excess of a predetermined value P1, the judgment section 9a applies the judgment result to the controller 1a. In response to the judgment result, the controller 1a outputs an indication signal for setting the target rotational speed of the electric motor 4 to a high level as shown in FIG. 22. In accordance with this indication signal, the motor drive circuit 2 rotationally drives the electric motor 4 by raising the applied voltage a level higher, and thereby increases the output thereof (assisted rotation mode).

In the case where the manipulation of the steering wheel 7 ceases, on the other hand, the working oil pressure drops for a reduced load, with the result that less current flows in the electric motor 4, thereby reducing the motor current detection signal outputted from the motor current detection circuit 3. Then, the output signal of the peak hold circuit 8 is progressively reduced in accordance with a predetermined characteristic, so that the value of the signal held and outputted which is differentiated by the differentiation section 10 is also reduced (and assumes a negative value). When the differentiated value (parameter computation value) is reduced below a predetermined value P2, the judgment section 9a applies the judgment result to the controller 1a. The controller 1a, as shown in FIG. 22, outputs an indication signal for setting the target rotational speed of the electric motor 4 to the low level in accordance with the judgment result. In response to the indication signal, the motor drive circuit 2 lowers the voltage to be applied to the electric motor 4 by one level and rotationally drives the electric motor 4, so that the output thereof is reduced (waiting rotation mode).

Figure 19A:
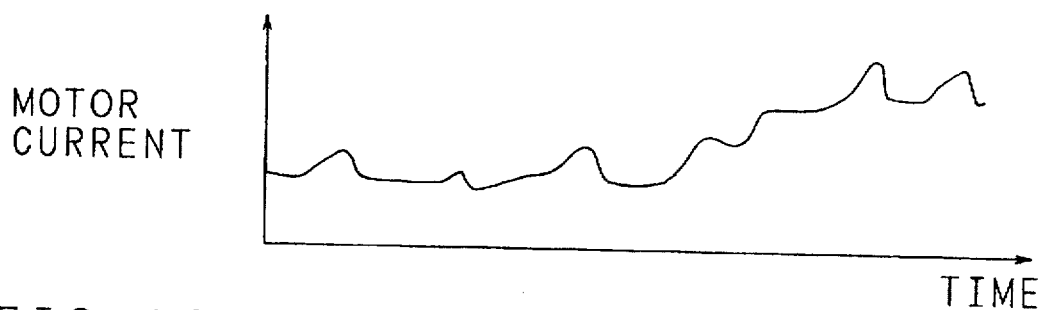
FIGS. 19A to 19D are diagrams for explaining the operation of the power steering apparatus shown in FIG. 18.
Figure 19B:
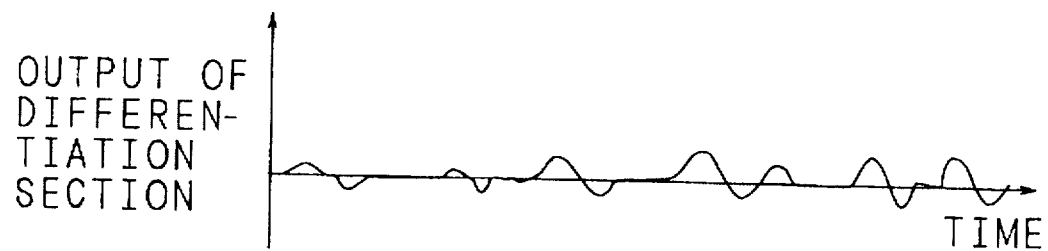
Figure 19C:
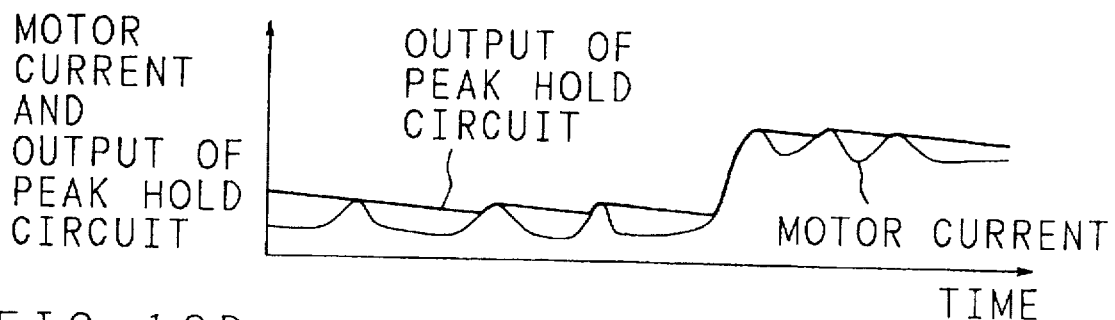

In the absence of the peak hold circuit 8, the value of the current flowing in the electric motor 4 as shown in FIG. 19A and differentiated by the differentiation section 10, for example, would include no portion thereof especially emphasized, as shown in FIG. 19B.

Figure 19D:
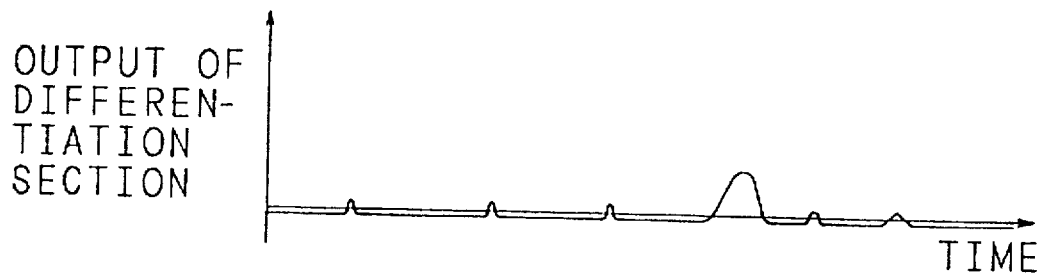

In this power steering apparatus, in contrast, with the manipulation of the steering wheel 7 rapidly increasing the current flowing in the electric motor 4, the output of the peak hold circuit 8 follows the rapid current increase, as shown in FIG. 19C. In the case of a periodic and monotonous change of characteristics such as irregular rotation of the electric motor 4 not attributable to the steering operation, for example, the change in the output of the peak hold circuit 8 is smoothed off. As shown in FIG. 19D, therefore, the value differentiated by the differentiation section 10 can be obtained which emphasizes only the rapid increase of the current flowing in the electric motor caused by the steering operation.

For this reason, a predetermined value for the judgment section 9a used to judge the differentiated value (parameter computation value) produced from the differentiation computation section 10 can be set smaller. The time lag between the start of steering operation and the time of switching from waiting rotation mode to assisted rotation mode can thus be reduced.

Also, even in the case where the motor current detection signal undergoes a change, either upward or downward, in the neighborhood of the threshold level, the peak hold circuit 8 holds and outputs the peak of the motor current detection signal. The signal held and outputted, however, is decreased progressively in accordance with a predetermined characteristic, so that the differentiated value produced from the differentiation section 10 assumes only a slightly negative value. The controller 1a thus switches the control mode only once from waiting rotation mode to assisted rotation mode, and therefore no hunching occurs.

Figure 20:
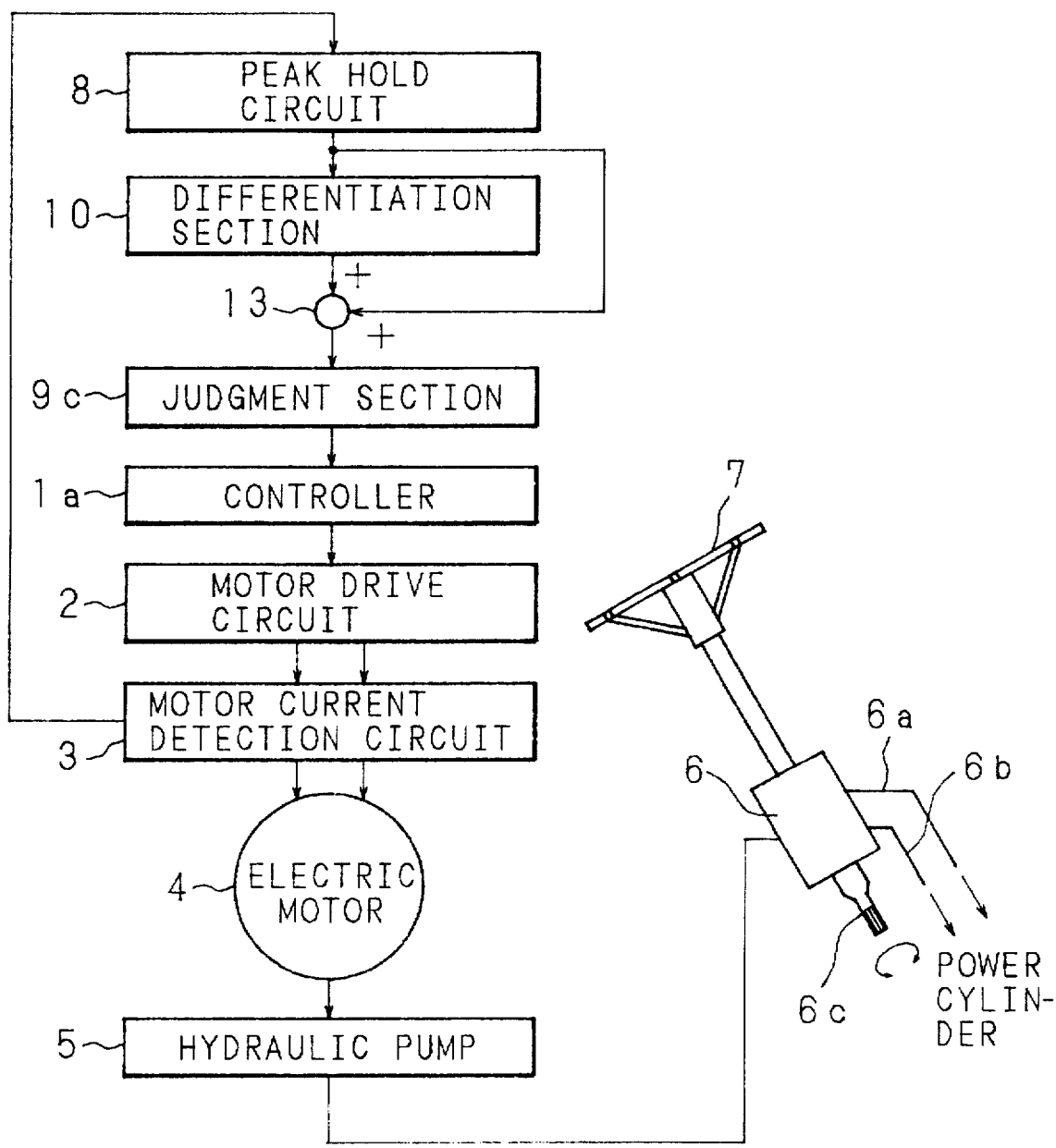
FIG. 20 is a block diagram showing a configuration of the essential parts of a power steering apparatus according to a fifth embodiment of the invention.

Embodiment 5:

FIG. 20 is a block diagram showing a configuration of the essential parts of a power steering apparatus according to a fifth embodiment. In this power steering apparatus, a motor current detection circuit 3 for detecting the current flowing in an electric motor 4 is inserted between a motor drive circuit 2 and the electric motor 4. The motor current detection signal produced from the motor current detection circuit 3 is applied to a differentiation section 10 through a peak hold circuit 8 for holding and outputting the peak value of the current.

The differentiation section 10 differentiates the signal inputted thereto, and the value thus differentiated is added to the output signal from a peak hold circuit 8 at a summing point 13, with the sum being applied to a judgment section 9c. The judgment section 9c judges the relative magnitudes between the sum (parameter computation value) and a predetermined value, and applies the result of judgment to a controller 1a. The controller 1a specifies a target rotational speed for the electric motor 4 in accordance with the judgment result.

The peak hold circuit 8 detects, holds and outputs the peak of the motor current detection signal outputted from the motor current detection circuit 3. In the case where the input signal is smaller than the signal held and outputted, output signal progressive reduction means progressively reduces the signal held and outputted by the peak hold circuit 8 in accordance with a predetermined characteristic, as shown in FIG. 19C. The configuration of the other parts of the essential parts is similar to that of the corresponding parts of the power steering apparatus according to the fourth embodiment, and therefore will not be described any further.

The operation of a power steering apparatus having the above-mentioned configuration will be described below.

When the steering wheel 7 is not manipulated and therefore any steering assisting power is not required (i.e., when the current flowing in the electric motor 4 is small), the controller 1a outputs an indication signal for setting the target rotational speed of the electric motor 4 to a low level and thereby reduces the output of the electric motor 4 (waiting rotation mode) in order to suppress energy consumption, as shown in FIG. 22.

The peak hold circuit 8 detects the peak value of the motor current detection signal outputted from the motor current detection circuit 3, and holds and outputs the value thus detected. In the case where the input signal is smaller than the signal held and outputted, the signal held and outputted is progressively decreased in accordance with a predetermined characteristic.

The differentiation section 10 normally differentiates the output signal from the peak hold circuit 8, and the value thus differentiated is added to the output signal from the peak hold circuit 8 at a summing point 13. The sum thus obtained is applied to the judgment section 9c, where the relative magnitudes between the sum and a predetermined value are judged, with the judgment being applied to the controller 1a.

Assume that the manipulation of the steering wheel 7 activates a control valve 6, increases the working oil pressure for an increased load, and also increases the current in the electric motor 4 increases, thereby increasing the motor current detection signal outputted from the motor current detection circuit 3. Then, the output signal of the peal hold circuit 8 also increases, resulting in an increased value differentiated at the differentiation section 10. The summing point 13 adds the output signal of the peak hold circuit 8 to the differentiated value of the output signal of the peak hold circuit 8, and applies the sum to the judgment section 9c.

In the case where the sum (parameter computation value) exceeds a predetermined value P1, the judgment section 9c applies the result of judgment to the controller 1a. In accordance with this judgment result, the controller 1a outputs an indication signal specifying the target rotational speed of the electric motor 4 to a high level as shown in FIG. 22. The motor drive circuit 2 rotationally drives the electric motor 4 at an applied voltage higher by one level and thereby increases the output thereof (assisted rotation mode) in response to the indication signal.

When the manipulation of the steering wheel 7 ceases, on the other hand, the working oil pressure drops for a reduced load, and the current flowing in the electric motor 4 is reduced, thereby reducing the motor current detection signal outputted from the motor current detection circuit 3. As a result, the output signal of the peak hold circuit 8 progressively decreases in accordance with a predetermined characteristic, thereby decreasing the value differentiated by the differentiation section 10 (which value assumes a negative value). The summing point 13 adds the output signal of the peak hold circuit 8 and the differentiated value of the output signal of the peak hold circuit 8 to each other, and applies the sum to the judgment section 9c.

When the sum (parameter computation value) is reduced below a predetermined value P2, the judgment section 9c applies the judgment result to the controller 1a. The controller 1a, in turn, as shown in FIG. 22, outputs the indication signal for setting the target rotational speed of the electric motor 4 to the low level in accordance with the judgment result. The motor drive circuit 2, in accordance with the indication signal, rotationally drives the electric motor 4 at an applied voltage lower by one level, and thereby reduces the output of the electric motor 4 (waiting rotation mode).

As compared with the power steering apparatus according to the fourth embodiment, the power steering apparatus in this embodiment has the additional advantage that even when the steering wheel 7 is manipulated gently with a small rate of increase (differentiated value) in the motor current detection signal, the target rotational speed of the electric motor 4 can be controlled at least with the output signal of the peak hold circuit 8.

Figure 21:
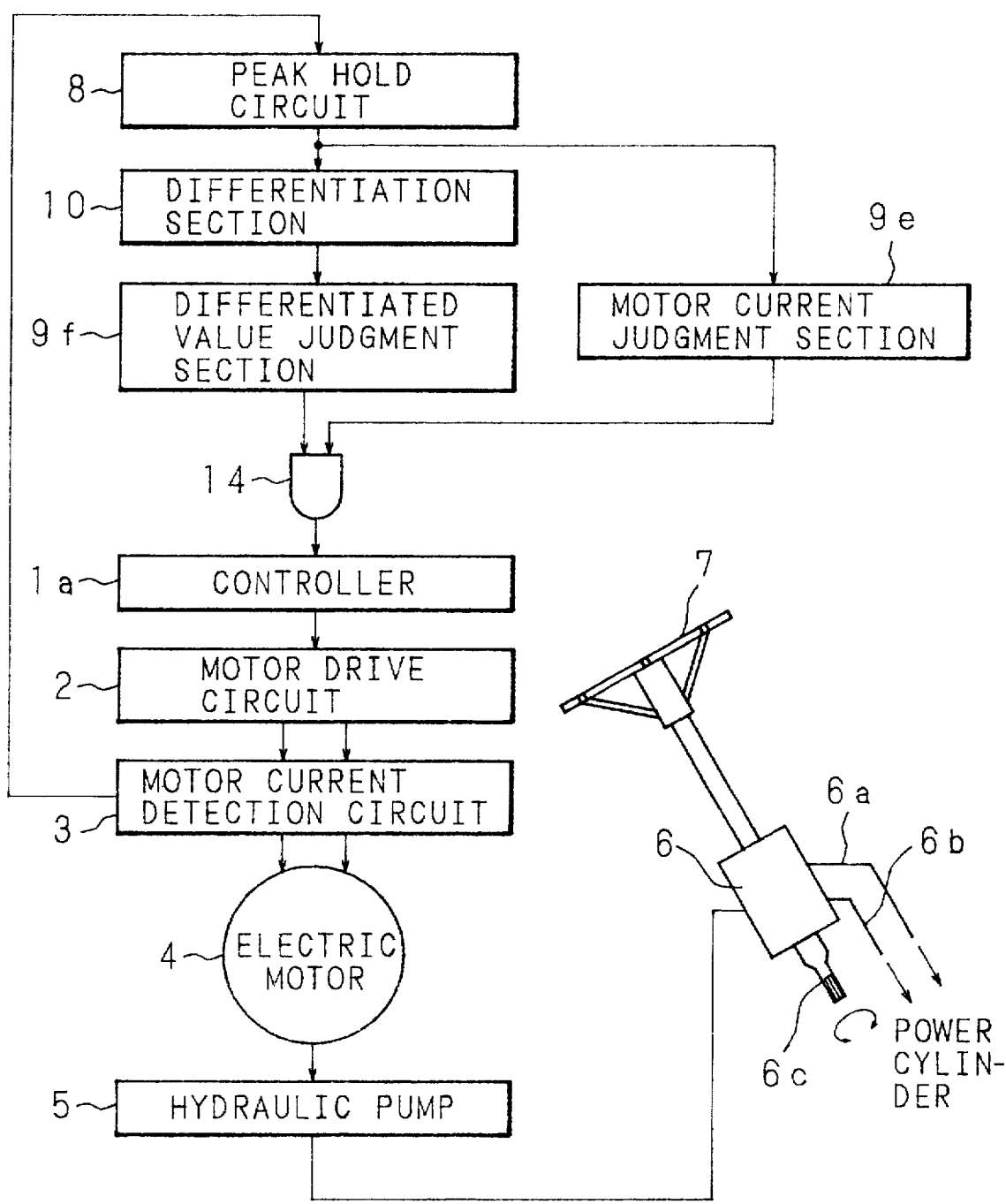
FIG. 21 is a block diagram showing a configuration of the essential parts of a power steering apparatus according to a sixth embodiment of the invention.

Embodiment 6:

FIG. 21 is a block diagram showing a configuration of the essential parts of a power steering apparatus according to a sixth embodiment. With this power steering apparatus, a motor current detection circuit 3 for detecting the current flowing in an electric motor 4 is interposed between a motor drive circuit 2 and the electric motor 4. The motor current detection signal outputted from the motor current detection circuit 3 is applied to a differentiation section 10 after the peak thereof is held and outputted at a peak hold circuit 8. The peak hold circuit 8 detects, holds and outputs the peak of the motor current detection signal outputted from the motor current detection circuit 3. In the case where the input signal is smaller than the signal held and outputted, output signal progressive reduction means progressively decreases the signal held and outputted in accordance with a predetermined characteristic as shown in FIG. 19C.

The differentiation section 10 differentiates the signal outputted from the peak hold circuit 8, and the value thus differentiated is applied to a differentiated value judgment section 9f. The differentiated value judgment section 9f judges the relative magnitudes between the differentiated value and a predetermined value, and applies the judgment result to an AND section 14.

The signal outputted from the peak hold circuit 8, on the other hand, is applied also to a motor current judgment section 9e. The motor current judgment section 9e judges the relative magnitudes between the signal thus input and a predetermined value, and applies the judgment result to the AND section 14.

The AND section 14 computes the logic product of the judgment result of the differentiated value judgment section 9f and the judgment result of the motor current judgment section 9e, and applies the result of computation to the controller 1a. In accordance with the computation result, the controller 1a indicates a target rotational speed of the electric motor 4. The configuration of the remaining essential parts is similar to that of the corresponding parts of the power steering apparatus according to the fourth embodiment, and therefore will not be described any further.

The operation of a power steering apparatus having the above-mentioned configuration will be described below.

In the case where the steering wheel 7 is not manipulated and therefore no steering assisting power is required (i.e., when the current flowing in the electric motor 4 is small), the controller 1a outputs an indication signal for specifying the target rotational speed of the electric motor 4 to a low level and thereby reduces the output of the electric motor 4 in order to suppress energy consumption (waiting rotation mode) as shown in FIG. 22.

The peak hold circuit 8 detects the peat of the motor current detection signal outputted from the motor current detection circuit 3 and holds and outputs the value thus detected. In the case where the input signal is smaller than the signal held and outputted, the signal held and outputted is reduced progressively in accordance with a predetermined characteristic.

The differentiation section 10 normally differentiates the output signal of the peak hold circuit 8, and the value thus differentiated is applied to the differentiated value judgment section 9f. The differentiated value judgment section 9f judges the relative magnitudes between the differentiated value and a predetermined value, and applies the judgment result to the AND section 14. The motor current judgment section 9e normally judges the relative magnitudes between the output signal from the peak hold circuit 8 and a predetermined value, and applies the judgment result to the AND section 14.

The AND section 14 computes the logic product of the judgment result of the differentiated value judgment section 9f and the judgment result of the motor current judgment section 9e, and applies the computation result to the controller 1a. The controller 1a indicates a target rotational speed of the electric motor 4 in accordance with the logic computation result.

Assume that with the manipulation of the steering wheel 7 and activation of a control valve 6, the working oil pressure rises for an increased load, the current flowing in the electric motor 4 increases and the motor current detection signal outputted from the motor current detection circuit 3 also increases. Then, the output signal of the peak hold circuit 8 also increases, and so does the value differentiated by the differentiation section 10. When the differentiated value (parameter computation value) increases in excess of a predetermined value, the differentiated value judgment section 9f applies the judgment result thereof to the AND section 14 as an H-level signal.

When the output signal of the peak hold circuit 8 increases in excess of a predetermined value, the motor current judgment section 9e applies the judgment result thereof to the AND section 14 as an H-level signal.

In the case where judgment result of both the differentiated value judgment section 9f and the motor current judgment section 9e are at H-level, the AND section 14 applies an H-level signal to the controller 1a. The controller 1a, in response to the H-level signal, outputs an indication signal for specifying the target rotational speed of the electric motor 4 to a high level, as shown in FIG. 22. In response to this indication signal, the motor drive circuit 2 rotationally drives the electric motor 4 at an applied voltage one level higher, and thereby increases the output thereof (assisted rotation mode).

In the case where the manipulation of the steering wheel 7 ceases, on the other hand, the working oil pressure drops for a reduced load, and the resulting reduction in the current flowing in the electric motor 4 reduces the motor current detection signal outputted from the motor current detection circuit 3. The output signal of the peal hold circuit 8 is progressively decreased in accordance with a predetermined characteristic, and the value differentiated by the differentiation section 10 thereby decreases (which value assumes a negative value). When the differentiated value (parameter computation value) decreases below a predetermined value, the differentiated value judgment section 9f applies the judgment result thereof to the AND section 14 as a L-level signal.

When the output signal from the peal hold circuit 8 decreases below a predetermined value, the motor current judgment section 9e applies the judgment result thereof to the AND section 14 as a L-level signal.

In the case where at least one of the judgment results of the differentiated value judgment section 9f and the motor current judgment section 9e is at L-level, the AND section 14 applies a L-level signal to the controller 1a. In response to this L-level signal, the controller 1a outputs an indication signal for setting the target rotational speed of the electric motor 4 to the low level, as shown in FIG. 22. In response to this indication signal, the motor drive circuit 2 rotationally drives the electric motor 4 at the applied voltage one level lower, and thereby reduces the output thereof (waiting rotation mode)

In this power steering apparatus, the controller 1a controls by switching the target rotational speed of the electric motor 4 in accordance with the logic product of the judgments at the differentiated value judgment section 9f and the motor current judgment section 9e. Therefore, the predetermined value of the output signal from the peak hold circuit 8 of the motor current judgment section 9e for judging the relative magnitudes can be set at a relatively low level. Consequently, in addition to the advantage of the power steering apparatus according to the fourth embodiment, this embodiment has the advantage of a shorter time lag between the time point when the steering wheel begins to be manipulated and the time point when the target rotational speed of the electric motor 4 reaches a high level and the control mode is switched from waiting rotation mode to assisted rotation mode. The steering assistance response thus is improved.

The AND section 14 may alternatively be logic means for computing the logic sum of the judgments at the differentiated value judgment section 9f and the motor current judgment section 9e. In such a case, the predetermined value for the motor current judgment section 9e for judging the relative magnitudes cannot be set at a comparatively low level. When the current flowing in the electric motor 4 begins to follow an upward trend, however, the differentiated value of the output signal of the peak hold circuit 8 causes the target rotational speed of the electric motor 4 to be immediately increased to a high level. The time lag is reduced, therefore, between the time point when the steering wheel 7 begins to be manipulated and the time point when the control mode is switched from waiting rotation mode to assisted rotation mode. Also, even when the manipulation of the steering wheel 7 is so gentle that the rate of increase (differentiated value) of the motor current detection signal is small, the target rotational speed of the electric motor 4 can be controlled by being switched with at least the output signal of the peak hold circuit 8.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power steering apparatus comprising:
a control valve for controlling the pressure of the working oil for generating the steering-assisting power on the basis of the operation of the steering wheel;
a hydraulic pump for transmitting the working oil under a predetermined pressure to said control valve;
an electric motor for driving said hydraulic pump;
means for detecting the load of said hydraulic pump and outputting a load detection signal;
smoothing means for smoothing said load detection signal; and
control means for controlling the rotational speed of said electric motor on the basis of a signal smoothed by said smoothing means.

2. A power steering apparatus according to claim 1, further comprising a smoothed signal correction means for correcting said smoothed signal on the basis of said smoothed signal in the absence of steering input and applying the corrected signal to said control means,
wherein said control means includes waiting rotation mode for driving said electric motor at a low rotational speed when the corrected smoothed signal is smaller than a predetermined value, and assisted rotation mode for driving said electric motor at a high rotational speed when the corrected smoothed signal is larger than the predetermined value.

3. A power steering apparatus according to claim 2, wherein said smoothed signal correction means includes:
minimum holding means for detecting, holding and outputting an ever-changing minimum value of said smoothed signal; and deviation computing means for computing the deviation between said smoothed signal and the minimum value held and outputted by said minimum holding means, and applying the deviation as the corrected smoothed signal to said control means.

4. A power steering apparatus according to claim 3, wherein said minimum holding means includes means for progressively increasing the signal held and outputted in accordance with a predetermined characteristic when said smoothed signal is larger than the signal held and outputted.

5. A power steering apparatus according to claim 4, further comprising a reset circuit for resetting the output of said minimum holding means at the time of operation start at a predetermined value.

6. A power steering apparatus according to claim 1, wherein said smoothing means is a first peak hold circuit.

7. A power steering apparatus according to claim 1, wherein said smoothing means is a low-pass-filter.

8. A power steering apparatus according to claim 6, wherein said first peak hold circuit includes means for progressively reducing the signal held and outputted in accordance with a predetermined characteristic when said load detection signal is smaller than the signal held and outputted.

9. A power steering apparatus according to claim 8, further comprising inertial load component removing means for removing signal component due to the inertial load of said hydraulic pump and said electric motor, contained in said smoothed signal from said first peak hold circuit and generated at the time start of transfer from assisted rotation mode to waiting rotation mode and applying the signal obtained by removing to said minimum holding means.

10. A power steering apparatus according to claim 9, wherein said inertial load component removing means is a second peak hold circuit, and includes means for progressively reducing the signal held and outputted in accordance with a predetermined characteristic when said smoothed signal is smaller than the signal held and outputted.

11. A power steering apparatus according to claim 2, further comprising inertial load component removing means for smoothing said load detection signal and removing signal component due to the inertial load of said hydraulic pump and said electric motor, contained in said load detection signal and generated at the time start of transfer from assisted rotation mode to waiting rotation mode, wherein said smoothed signal correction means includes:
minimum holding means for detecting, holding and outputting an ever-changing minimum value of said smoothed signal outputted from said inertial load component removing means; and
deviation computing means for computing the deviation between said smoothed signal from said smoothing means and said minimum value held and outputted by said minimum holding means and outputting the deviation as the corrected smoothed signal, and said control means controls said electric motor by switching between waiting rotation mode and assisted rotation mode on the basis of said corrected smoothed signal.

12. A power steering apparatus according to claim 11, wherein said minimum holding means includes means for progressively increasing the signal held and outputted in accordance with a predetermined characteristic when said smoothed signal from said inertial load component removing means is larger than the signal held and outputted.

13. A power steering apparatus according to claim 12, further comprising a reset circuit for resetting the output of said minimum holding means at the time of operation start at a predetermined value.

14. A power steering apparatus according to claim 11, wherein said smoothing means and said inertial load component removing means are peak hold circuits respectively.

15. A power steering apparatus according to claim 14, wherein each of said peak hold circuits includes means for progressively reducing the signal held and outputted in accordance with a predetermined characteristic when a signal inputted thereto is smaller than the signal held and outputted.

16. A power steering apparatus according to claim 1, further comprising:
parameter computation means for computing a parameter on the basis of said smoothed signal; and
parameter judgment means for judging the relative magnitudes between said parameter and a predetermined value and applying the judgment result to said control means,
wherein said control means controls by switching between waiting rotation mode for driving said electric motor at a low rotational speed and assisted rotation mode for driving said electric motor at a high rotational speed on the basis of judgment result of said parameter judgment means.

17. A power steering apparatus according to claim 16, wherein said parameter computation means is means for differentiating said smoothed signal.

18. A power steering apparatus according to claim 16, wherein said parameter computation means includes:
means for differentiating said smoothed signal; and
means for adding the signal differentiated by said differentiation means to said smoothed signal and outputting the added signal as the parameter.

19. A power steering apparatus according to claim 16, further comprising:
smoothed signal judgment means for judging the relative magnitudes between said smoothed signal and a predetermined value; and
logic computation means for computing the logic between the judgment result of said smoothed signal judgment means and the judgment result of said parameter judgment means,
wherein said control means controls by switching between waiting rotation mode and assisted rotation mode on the basis of computation result of said logic computation means.

* * * * *